(12) United States Patent
Arano et al.

(10) Patent No.: US 10,825,193 B2
(45) Date of Patent: Nov. 3, 2020

(54) POSITION DETECTING APPARATUS AND COMPUTER-READABLE RECORDING MEDIUM

(71) Applicant: OMRON Corporation, Kyoto (JP)

(72) Inventors: Tomohiro Arano, Kusatsu (JP);
Yoshihide Yamamoto, Kusatsu (JP);
Hiroyuki Hazeyama, Otsu (JP)

(73) Assignee: OMRON Corporation, Kyoto (JP)

(*) Notice: Subject to any disclaimer, the term of this patent is extended or adjusted under 35 U.S.C. 154(b) by 101 days.

(21) Appl. No.: 16/004,429

(22) Filed: Jun. 11, 2018

(65) Prior Publication Data
US 2019/0096083 A1 Mar. 28, 2019

(30) Foreign Application Priority Data

Sep. 27, 2017 (JP) ................................ 2017-186021

(51) Int. Cl.
*G06T 7/70* (2017.01)
*G06T 7/73* (2017.01)
*G06T 1/60* (2006.01)

(52) U.S. Cl.
CPC ............. *G06T 7/70* (2017.01); *G06T 1/60* (2013.01); *G06T 7/73* (2017.01); *G06T 2207/10016* (2013.01); *G06T 2207/30204* (2013.01)

(58) Field of Classification Search
CPC .... G06T 7/70; G06T 7/73; G06T 1/60; G06T 2207/10016; G06T 2207/30204; G01B 11/00; G01B 21/042
See application file for complete search history.

(56) References Cited

U.S. PATENT DOCUMENTS 4,209,853 A * 6/1980 Hyatt .................. B60R 16/0373
342/179
4,641,071 A * 2/1987 Tazawa ................ G05B 19/232
318/561

(Continued)

FOREIGN PATENT DOCUMENTS

CN          1510491        7/2004
CN         101461053       6/2009

(Continued)

OTHER PUBLICATIONS

"Office Action of China Counterpart Application", dated Jun. 2, 2020, with English translation thereof, p. 1-p. 12.

*Primary Examiner* — Lewis G West
(74) *Attorney, Agent, or Firm* — JCIPRNET

(57) ABSTRACT

Provided is an environment for providing information for supporting adjustment of the respective parts for positioning. A position detecting apparatus includes: an image processing unit that detects, through image processing, a position of a feature portion from image data imaged and acquired when the feature portion of an object is positioned at the respective target positions by a moving mechanism; a position storage unit that stores the detected positions detected at the target positions in association with the respective target positions; and a display data generation unit that generates data for displaying information related to the detected positions on a display unit. The display data generation unit generates data for displaying the respective target positions and the respective detected positions, which are stored in association with the target positions, in the same coordinate space.

19 Claims, 34 Drawing Sheets

(56) References Cited

U.S. PATENT DOCUMENTS

| | | | | |
|---|---|---|---|---|
| 5,310,192 | A * | 5/1994 | Miyake | A63F 9/0291 463/5 |
| 5,642,434 | A * | 6/1997 | Nakao | G06T 7/70 382/220 |
| 6,718,057 | B1 * | 4/2004 | Mori | G06T 7/73 250/491.1 |
| 7,580,558 | B2 * | 8/2009 | McEvoy | B41F 15/0818 348/125 |
| 8,400,503 | B2 * | 3/2013 | Linnenkohl | G06K 9/32 348/125 |
| RE44,353 | E * | 7/2013 | Mirtich | G06F 9/451 382/100 |
| 9,424,646 | B2 * | 8/2016 | Ikeda | G06T 7/0004 |
| 9,592,608 | B1 * | 3/2017 | Bingham | B25J 9/0081 |
| 9,678,988 | B2 * | 6/2017 | Ishihara | G06F 16/583 |
| 9,884,424 | B2 * | 2/2018 | Sonoda | B25J 9/1697 |
| 9,914,215 | B2 * | 3/2018 | Motoyoshi | B25J 9/1633 |
| 9,919,422 | B1 * | 3/2018 | Horton | B25J 9/1633 |
| 10,059,001 | B2 * | 8/2018 | Miyazawa | B25J 9/1697 |
| 10,112,303 | B2 * | 10/2018 | Vakanski | B25J 9/1664 |
| 10,279,442 | B2 * | 5/2019 | Apold | B23P 19/06 |
| 10,661,440 | B2 * | 5/2020 | Oumi | G05B 19/42 |
| 10,695,912 | B2 * | 6/2020 | Ishihara | B25J 9/1697 |
| 2001/0048759 | A1 * | 12/2001 | Hiramoto | G06T 7/0006 382/141 |
| 2003/0144809 | A1 * | 7/2003 | Puchtler | G05B 19/404 702/105 |
| 2007/0001010 | A1 * | 1/2007 | Yamane | B41J 11/007 235/454 |
| 2008/0267450 | A1 * | 10/2008 | Sugimoto | A63H 17/395 382/103 |
| 2011/0096031 | A1 * | 4/2011 | Nakanishi | G06F 3/0416 345/175 |
| 2011/0106311 | A1 * | 5/2011 | Nakajima | B25J 9/163 700/253 |
| 2011/0169893 | A1 | 7/2011 | Takafuji | |
| 2016/0068352 | A1 * | 3/2016 | Oda | B65G 43/08 700/213 |
| 2016/0093058 | A1 * | 3/2016 | Moteki | G06K 9/4604 382/154 |
| 2016/0184995 | A1 * | 6/2016 | Uchiyama | G06T 7/73 700/259 |
| 2020/0059596 | A1 * | 2/2020 | Yoo | G06T 7/73 |
| 2020/0100668 | A1 * | 4/2020 | Higashikawa | A61B 3/0008 |

FOREIGN PATENT DOCUMENTS

| | | |
|---|---|---|
| CN | 101981512 | 2/2011 |
| CN | 104102226 | 10/2014 |
| CN | 105319864 | 2/2016 |
| CN | 106444852 | 2/2017 |
| JP | H06137840 | 5/1994 |
| JP | 2001142513 | 5/2001 |
| JP | 2003050106 | 2/2003 |
| JP | 2003307466 | 10/2003 |
| JP | 2005049222 | 2/2005 |

\* cited by examiner

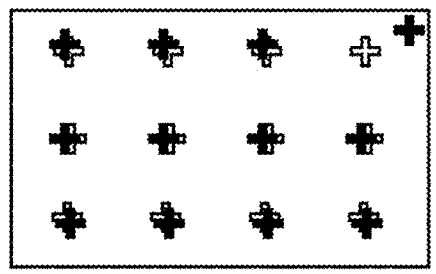
White: target position
Black: sampling position
FIG. 15A
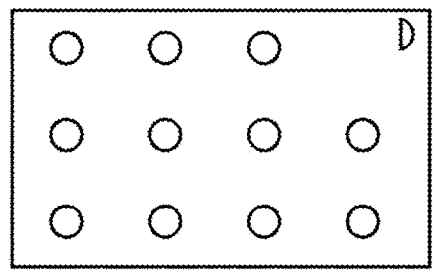
○ :Feature image
D :Background image
FIG. 15B
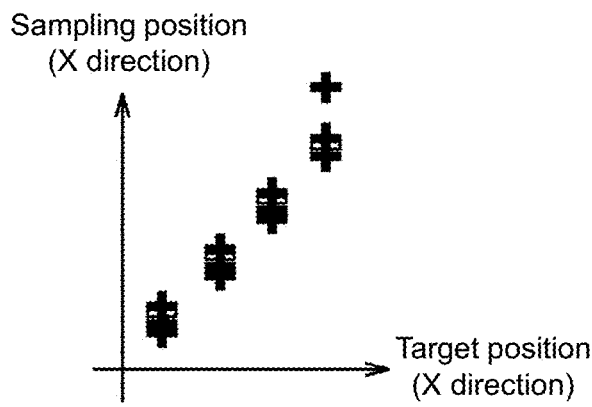
White: target position
Black: sampling position
FIG. 15C
| X direction (target position) | Minimum error | Maximum error |
|---|---|---|
| 10 | 3 | 4 |
| 20 | 3 | 5 |
| 30 | 1 | 3 |
| 40 | 3 | 20 |
FIG. 15D White: target position    Black: sampling position White: target position    Black: sampling position

| | Evaluation | Estimated factor and countermeasure | |
|---|---|---|---|
| R1 | RA — Points at which target positions and sampling positions do not coincide are present | RB — ■ Background part outside target mark is erroneously detected at inconsistent point<br>RC — → Adjust search setting (model, setting parameter, and the like) | |
| R2 | RA — Amounts of deviations of sampling positions increase in X direction by specific amount (amounts of movement do not coincide with measurement results) | RA — ■ Amount of movement of stage is inappropriate<br>RB — → Check stage control | |
| R3 | RA — Point at which target position do not coincide with sampling position is present at end of image | RA — ■ Influence of camera lens distortion<br>RB — → Change lens to lens with no distortion in field of view | |

FIG. 26

| Evaluation | Estimated factor and countermeasure |
|---|---|
| R4 — Variations in samplings are large | ■ Is setting of detection unit (search or the like) for sampling inappropriate, and hasn't sampling been able to be constantly performed at same position? — RB<br>→ Adjust search setting (model, setting parameter, and the like) — RC<br>■ Influence of random noise during image capturing — RB<br>→ Reduce influence by employing setting of increasing number of times sampling performed at same position and averaging results — RC<br>■ Variations are large since image is captured before vibration of apparatus ends — RB<br>→ Inspect time required for vibration to end and adjust imaging timing — RC |
| R5 — Error of sampling is large even with setting for correction processing | ■ Setting for image correction processing is inappropriate — RB<br>→ Check and adjust setting for image correction processing — RC |

FIG. 27

| Evaluation | Estimated factor and countermeasure | |
|---|---|---|
| R8: Variations of sampling are large (rotation center of stage has not accurately been estimated) | ■ Setting for detection unit (search or the like) for sampling is inappropriate and unsatisfactory, and sampling has not been able to be constantly performed at same position<br>→ Adjust search setting (model, setting parameter, and the like) | RB<br>RC |
| | ■ Influence of random noise during image capturing<br>→ Reduce influence by employing setting of increasing number of times sampling performed at same position and averaging results | RB<br>RC |
| | ■ Variations are large since image is captured before vibration of apparatus ends<br>→ Inspect time required for vibration to end and adjust imaging timing | RB<br>RC |
| R9: Error of sampling is large even with setting for correction processing | ■ Setting for image correction processing is inappropriate<br>→ Check and adjust setting for image correction processing | RB<br>RC |

FIG. 29

| Evaluation | Estimated factor and countermeasure |
|---|---|
| R10 Calibration has been able to be performed only on part of image (rotation center of stage has inappropriately been estimated) | ■ Setting value of sampling angle range is inappropriate<br>→ Check whether or not setting value of angle range is appropriate (in particular, whether or not angle range is too small) and adjust setting<br><br>× (angle range is narrow)  ○ (angle range is wide) |
| R11 Points at which target positions and sampling positions do not coincide are present | ■ Setting for detecting rotating object is inappropriate<br>→ Adjust search setting related to detection of rotating object<br><br>× (detected at inappropriate angle)  ○ (detected at appropriate angle) |

FIG. 30

| Evaluation | Estimated factor and countermeasure |
|---|---|
| R12 — RA Sampling intervals are not equal intervals (linearity) | ■ Camera has not been installed perpendicularly to calibration target —— RB<br>→ Check and adjust camera installation angle —— RC<br><br>○ ☐ Camera<br>Calibration target  90°<br>———→<br>Movement of stage<br><br>× Camera<br>Calibration target 120°<br>———→<br>Movement of stage  } RC1 |
| R13 — RA Measurement has not been able to be performed at ideal sampling position | ■ There is reason in stage, and inspection related to precision of stage is to be performed<br>■ Positioning precision is inappropriate —RB         —RC<br>→ Inspect reason of inappropriate positioning precision and adjust stage        —RB<br>■ Repeated positioning precision is inappropriate        —RC<br>→ Inspect reason of inappropriate repeated positioning precision and adjust stage<br>■ Lost motion has occurred —RB         —RC<br>→ Inspect reason of large lost motion and adjust stage<br>■ Backlash has occurred —RB         —RB<br>→ Inspect reason of large backlash and adjust stage  —RC<br>■ Straightness (horizontal direction) during movement of stage is high —RB<br>→ Inspect reason of high straightness (horizontal direction) and adjust stage        —RB<br>■ Amount of yawing during movement of stage is large  —RC<br>→ Inspect reason of large amount of yawing and adjust stage        —RB<br>■ Amount of rolling during movement of stage is large  —RC<br>→ Inspect reason of large amount of rolling and adjust stage        —RB<br>■ Amount of pitching during movement of stage is large —RC<br>→ Inspect reason of large amount of pitching and adjust stage<br>■ Error in XY orthogonality is large —RB         —RC<br>→ Inspect reason of large error in XY orthogonality and adjust stage<br>■ Center runout error of stage is large —RB         —RC<br>→ Inspect reason of large center runout and adjust stage<br>■ Surface runout error of stage is large —RB         —RC<br>→ Inspect reason of large surface runout and adjust stage |

POSITION DETECTING APPARATUS AND COMPUTER-READABLE RECORDING MEDIUM

CROSS-REFERENCE TO RELATED APPLICATION

This application claims the priority benefit of Japan application serial no. 2017-186021, filed on Sep. 27, 2017. The entirety of the above-mentioned patent application is hereby incorporated by reference herein and made a part of this specification.

BACKGROUND

Technical Field

The present disclosure relates to a position detecting apparatus and a program for measuring a position of an object, which is moved by a moving mechanism, using image processing and outputting information related to the measured position.

Description of Related Art

In the field of factory automation (FA), automatic control technologies using visual sensors have been widely used. For example, automated processing of operating various control devices by imaging an object such as a workpiece and executing image measurement processing such as pattern matching on the captured image has been realized.

In a case in which such visual sensors are used, calibration is needed in order to output results measured by the visual sensors to control devices. For example, Japanese Unexamined Patent Application Publication No. 6-137840 (Patent Document 1) discloses a simple and highly precise calibration method with no restriction of camera arrangement. Also, Japanese Unexamined Patent Application Publication No. 2003-50106 (Patent Document 2) discloses a positioning device based on calibration that does not require an input or adjustment of parameters by an operator.

PATENT DOCUMENTS

[Patent Document 1] Japanese Laid-open No. 6-137840
[Patent Document 2] Japanese Laid-open No. 2003-50106

In a case in which required positioning precision is not satisfied during running or activation of the positioning device, the cause is sought out. However, seeking out the cause requires knowhow of a person skilled in the positioning, and takes time. In addition, a user who has poor knowledge about the positioning does not know where to look. Although the cause of such insufficient positioning precision is insufficient calibration precision in many cases, it is difficult to find the cause. Therefore, it has been desired to shorten the aforementioned time taken to find the cause and to facilitate identification of places to look.

SUMMARY

The present disclosure is directed to such a need, and one objective thereof is to provide an environment for providing information for supporting adjustment of the respective parts for positioning.

According to an example of the present disclosure, there is provided a position detecting apparatus including: an image storage portion that stores image data obtained by imaging an object when a feature portion is positioned at a plurality of respective target positions by a moving mechanism configured to change the position of the object in which the feature portion for positioning is provided; an image processing portion that detects a position of the feature portion included in the image data from the image data through image processing; a position storage portion that stores the detected positions detected by the image processing portion in association with the target positions from the image data of the object positioned at the respective target positions; and a display data generation portion that generates data for displaying information related to the detected positions on a display unit. The display data generation portion generates data for displaying the respective target positions and the respective detected positions, which are stored in association with the target positions, in the same coordinate space.

In the aforementioned disclosure, the object is moved to the respective target positions a plurality of times by the moving mechanism, and the detected positions stored in association with the respective target positions in the position storage portion include a plurality of detected positions detected from the image data imaged and acquired by being moved to the target positions a plurality of times.

In the aforementioned disclosure, the coordinate space has multidimensional coordinate axes, and the display data generation portion generates data for displaying the target positions and the detected positions associated with the target positions on at least one coordinate axis from among the multidimensional coordinate axes.

In the aforementioned disclosure, the data for displaying the respective detected positions includes data for displaying the plurality of associated detected positions in a form of scatter plots in the coordinate space for each of the target positions.

In the aforementioned disclosure, the data for displaying the respective detected positions includes data for displaying the plurality of associated detected positions in a form of a chronological order that follows relative time elapse from a start of the detection of the plurality of detected positions for each of the target positions.

In the aforementioned disclosure, the data for displaying the respective detected positions includes data for displaying line segments that indicate relative positional relationships between the respective target positions and the detected positions associated with the target positions.

In the aforementioned disclosure, the line segments that indicate the relative positional relationships include data for displaying a line segment connecting the detected positions associated with the respective target positions in an order of the moving to the target positions by the moving mechanism or data for displaying a line segment connecting the respective target positions in the order of the moving by the moving mechanism.

In the aforementioned disclosure, the moving includes rotational movement of rotating about a predefined target center position, the target positions include the target center position, and the detected positions include an estimated center position of the rotation, which is estimated from the respective detected positions associated with the respective target positions.

In the aforementioned disclosure, the data for displaying the respective detected positions includes data for displaying the respective target positions on a circumferential line around the target center position at the center or data for displaying the detected positions associated with the respective target positions on a circumferential line around the estimated center position at the center.

In the aforementioned disclosure, the data for displaying the respective detected positions includes data for displaying the detected positions with differences from the associated target positions exceeding a threshold value in a predefined form.

In the aforementioned disclosure, the image processing portion detects an inclination angle from a predefined posture of the feature portion from the image of the feature portion, and the data for displaying the respective detected positions includes data for displaying the detected positions associated with the target positions as a mark that indicates the inclination angle.

In the aforementioned disclosure, the object is moved to the respective target positions a plurality of times by the moving mechanism, the detected positions stored in association with the respective target positions in the position storage portion include a plurality of detected positions detected from the image data imaged and acquired by being moved to the target positions a plurality of times, and the display data generation portion generates data for displaying statistical values of the plurality of detected positions at the target positions in association with the respective target positions.

In the aforementioned disclosure, the statistical values include at least a maximum value, a minimum value, and an average value of differences between the plurality of detected positions and the associated target positions.

In the aforementioned disclosure, the display data generation portion generates data for displaying differences of the plurality of detected positions associated with the target positions from the target positions in a form of a chronological order that follows relative time elapse from a start of the detection of the plurality of detected position.

In the aforementioned disclosure, the display data generation portion associates differences of the plurality of detected positions associated with the target positions from the target positions with predefined threshold values of the differences and generates data for displaying the respective detected positions in the form of the chronological order that follows the relative time elapse from the start of the detection of the plurality of detected positions.

In the aforementioned disclosure, the display data generation portion includes a portion that generates data for displaying the image data of the feature portion at which the detected positions are detected.

In the aforementioned disclosure, the display data generation portion further includes a portion that displays the target positions and the detected positions associated with the target positions in an enlarged manner.

In the aforementioned disclosure, the image processing includes correction parameters for correcting the image data from an amount of movement of the moving mechanism in order to detect a position of the feature portion from the image data, and the detected positions associated with the target positions include respective detected positions obtained in image processing before and after application of the correction parameters.

According to an example of the present disclosure, there is provided a position detecting apparatus including: an image storage portion that stores image data obtained by imaging an object when a feature portion is positioned at a plurality of target positions by a moving mechanism configured to change a position of the object in which the feature portion for positioning is provided; an image processing portion that detects a position of the feature portion that is included in the image data from the image data through image processing; a position storage portion that stores the detected positions detected by the image processing portion in association with the target positions from the image data of the object positioned at the respective target positions; a cause storage portion that stores a plurality of predefined cause data items that have evaluation content that represents evaluation of positional differences from the target positions in a coordinate system and an estimated cause estimated for the position differences in linkage with the evaluation content; an evaluation portion that evaluates detection differences that are differences between the target positions and the associated detected positions in the coordinate system in the position storage portion on the basis of a predefined reference; and a display data generation portion that generates data for displaying information related to the evaluation on a display unit. The display generation portion generates data for displaying the estimated cause in the cause storage portion, which corresponds to the evaluation content that represents evaluation by the evaluation portion.

In the aforementioned disclosure, the cause storage portion stores a countermeasure for addressing the estimated cause in linkage with the estimated cause, and the display data generation portion further generates data for displaying the countermeasure that corresponds to the estimated cause.

In the aforementioned disclosure, the object is moved to the respective target positions a plurality of times by the moving mechanism, and the detected positions stored in association with the respective target positions in the position storage portion include a plurality of detected positions detected from the image data imaged and acquired by being moved to the target positions a plurality of times.

In the aforementioned disclosure, the detection differences include statistical values of the differences between the target positions and the plurality of associated detected positions in the position storage portion.

In the aforementioned disclosure, the statistical values include at least one of values that indicate an average value, a maximum value, a minimum value, and a variation in the differences from the plurality of detected positions.

In the aforementioned disclosure, the estimated cause can include at least one of a condition for driving the moving mechanism, a parameter for the image processing, and a condition for imaging.

In the aforementioned disclosure, the display data generation portion generates data for displaying the respective target positions and the respective detected positions stored in association with the target positions in the same coordinate space.

According to an example of the present disclosure, there is provided a program for causing a computer to execute a position detecting method. The position detecting method includes the steps of: detecting a position of a feature portion that is included in image data from the image data acquired by imaging an object through image processing when the feature portion is positioned at a plurality of respective target positions by a moving mechanism configured to change a position of the object in which the feature portion for positioning is provided; storing the detected positions detected through the image processing in association with the target positions from the image data of the object positioned at the respective target positions; and generating data for displaying information related to the detected positions on a display unit, and the generating of the display data includes generating data for displaying the respective target positions and the respective detected positioned stored in association with the target positions in the same coordinate space.

According to an example of the present disclosure, there is provided a program for causing a computer to execute a position detecting method. The computer includes: a cause storage unit that stores a plurality of predefined cause data items that have evaluation content that represents evaluation of positional differences from the target positions in a coordinate system and an estimated cause estimated for the positional differences in linkage with the evaluation content. The position detecting method includes the steps of: detecting a position of a feature portion that is included in image data from image data acquired by imaging an object through image processing when the feature portion is positioned at a plurality of respective target positions by a moving mechanism configured to change a position of the object in which the feature portion for positioning is provided; storing the detected positions detected through the image processing in association with the target positions from the image data of the object positioned at the respective target positions; evaluating detection differences that are differences in the coordinate system between the stored target positions and the associated detected positions on a basis of a predefined reference; and generating data for displaying information related to the evaluation on a display unit. The generating of the data for displaying the information includes the step of generating data for displaying an estimated cause. In the generating of the data to be displayed, data for displaying the estimated cause, which corresponds to the evaluation content that represents the evaluation in the evaluating, in the cause storage unit is generated.

BRIEF DESCRIPTION OF THE DRAWINGS

FIG. 15A, FIG. 15B, FIG. 15C and FIG. 15D are diagrams illustrating an example of a position associating screen according to the embodiment.

FIG. 18 is a diagram illustrating an example of the position associating screen that displays variations in sampling positions according to the embodiment.

FIG. 19 is a diagram illustrating an example of the position associating screen that displays variations in the sampling positions according to the embodiment.

FIG. 20 is a diagram illustrating an example of the position associating screen that displays an effect of distortion correction according to the embodiment.

FIG. 21 is a diagram illustrating an example of the position associating screen obtained by sampling based on linear movement according to the embodiment.

FIG. 22 is a diagram illustrating an example of the position associating screen obtained by sampling based on rotation movement according to the embodiment.

FIG. 23 is a diagram illustrating another example of the position associating screen obtained by sampling based on rotation movement according to the embodiment.

FIG. 24 is a diagram illustrating another example of the position associating screen obtained by sampling based on rotation movement according to the embodiment.

FIG. 25 is a diagram illustrating another example of the position associating screen obtained by sampling based on rotation movement according to the embodiment.

FIG. 26 is a diagram illustrating an example of cause data Ri according to the embodiment.

FIG. 27 is a diagram illustrating an example of the cause data Ri according to the embodiment.

FIG. 29 is a diagram illustrating an example of the cause data Ri according to the embodiment.

FIG. 30 is a diagram illustrating an example of the cause data Ri according to the embodiment.

FIG. 31 is a diagram illustrating an example of the cause data Ri according to the embodiment.

FIG. 32 is a diagram exemplifying a user interface (UI) screen that is displayed during calibration according to the embodiment of the present disclosure.

DESCRIPTION OF THE EMBODIMENTS

Figure 1:
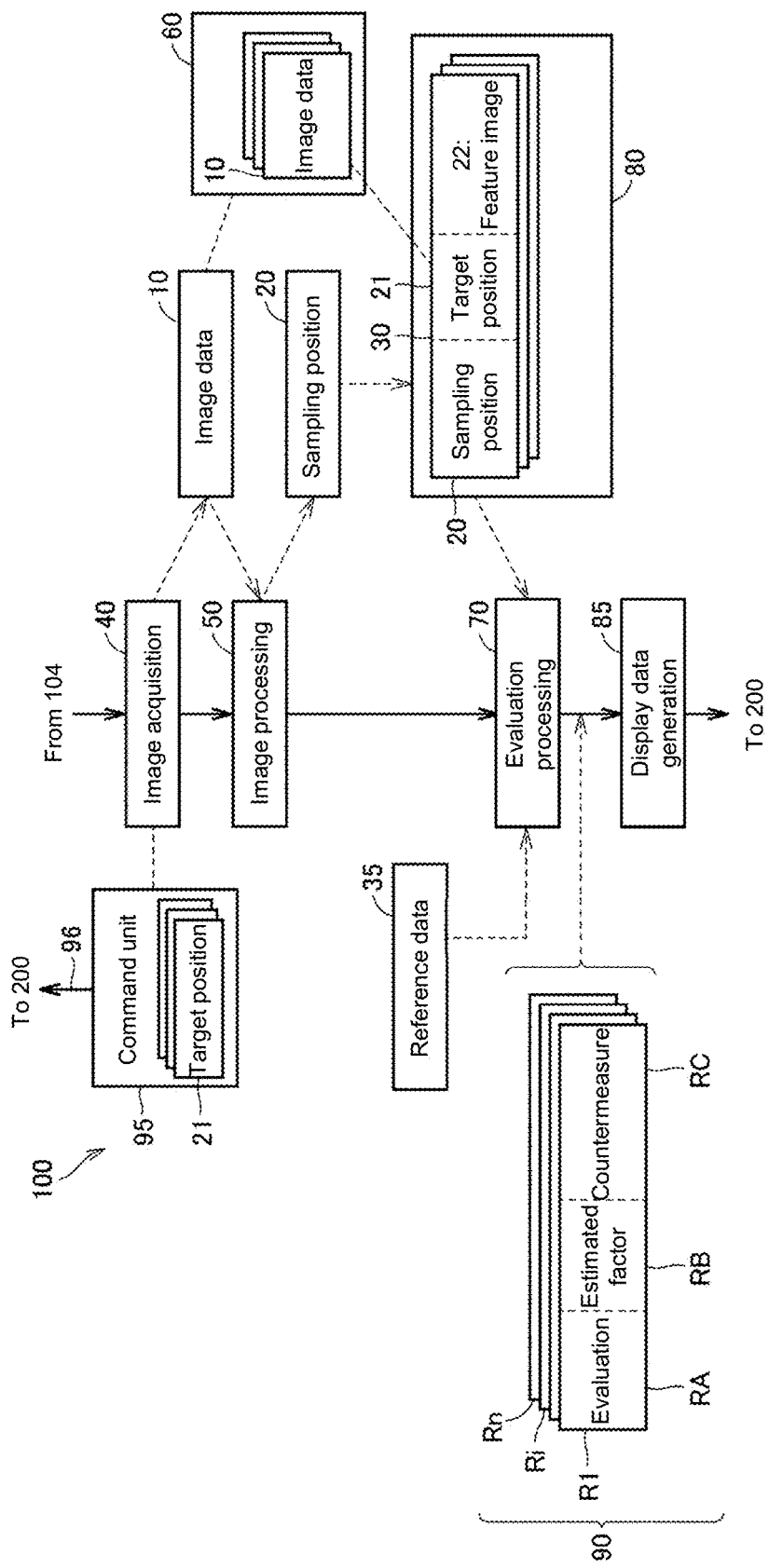
FIG. 1 a diagram schematically illustrating an example of a scenario in which a position detecting apparatus 100 according to an embodiment is applied.

According to the disclosure, it is possible to display the detected position of the feature portion, which is detected from the image data acquired by imaging the object moved to the respective target positions while the feature portion for the positioning that the object has is positioned at the plurality of target positions by the moving mechanism, in association with the target positions in the same coordinate space. Such display information can be provided as support information for improving calibration precision in a case of performing the calibration by using the position detecting apparatus.

According to the disclosure, it is possible to display the plurality of detected positions that are detected by being moved to the respective target positions a plurality of times in association with the target positions in the same coordinate space.

According to the disclosure, it is possible to display the respective target positions and the detected positions associated with the target positions in association in the coordinate space defined by at least one or more coordinate axes.

According to the disclosure, it is possible to cause the detected positions associated with the respective target positions to be displayed in the form of scattered plots that indicate a variation.

According to the disclosure, it is possible to cause the plurality of detected positions associated with the respective target positions to be displayed in the form of the chronological order that follows the relative time elapse from the start of the detection of the plurality of detected positions.

According to the disclosure, it is possible to cause the respective target positions and the detected positions associated with the target positions by line segments that indicate the relative positional relationships therebetween.

According to the disclosure, it is possible to cause the relative positional relationship between the respective target positions and the detected positions associated with the target positions to be displayed by the line segments connecting the detected positions in the order of the moving to the target positions by the moving mechanism or the line segments connecting the respective target positions in the order of the moving by the moving mechanism.

According to the disclosure, it is possible to cause the target center position that is the center of the rotation movement and the estimated center position of the rotation estimated from the detected positions associated with the target positions to be displayed in the associated manner in the same coordinate space in a case in which the rotation movement is performed by the moving mechanism.

According to the disclosure, it is possible to cause the respective target positions to be displayed on the circumferential line around the target center position as the center and to cause the detected positions associated with the respective target positions to be displayed on the circumferential line around the estimated center position as the center in a case in which the rotation movement is performed by the moving mechanism.

According to the disclosure, it is possible to cause the detected positions with the differences from the target positions exceeding the threshold value from among the detected positions associated with the target positions to be displayed in the predefined form.

According to the disclosure, it is possible to cause the image of the feature portion at the detected positions to be displayed by the mark that indicates the inclination angle from the predefined posture.

According to the disclosure, it is possible to cause the statistical values acquired from the plurality of detected positions associated with the respective target positions to be displayed.

According to the disclosure, it is possible to cause one of the maximum value, the minimum value, and the average value of the differences between the detected positions and the associated target positions to be displayed as statistical values acquired from the plurality of detected positions associated with the respective target positions.

According to the disclosure, it is possible to cause the differences of the plurality of detected positions associated with the target positions from the target positions to be displayed in the form of the chronological order that follows the relative time elapse from the start of the detection of the plurality of detected positions.

According to the disclosure, it is possible to cause the differences of the plurality of respective detected positions associated with the target positions from the target positions to be displayed in association with the predefined threshold values of the differences in the form of the chronological order that follows the relative time elapse from the start of the detection of the plurality of detected positions.

According to the disclosure, it is possible to display the image of the feature portion detected at the detected positions.

According to the disclosure, it is possible to cause the target positions and the detected positions associated with the target positions to be displayed in the enlarged manner.

According to the disclosure, it is possible to cause the detected positions before the correction parameters for correcting the image data from the amount of movement of the moving mechanism is applied and the detected positions detected by applying the correction parameters to be displayed as the detected positions associated with the target positions.

According to the disclosure, it is possible to evaluate the position differences between the detected position of the feature portion detected from the image data acquired by imaging the object that has moved to the respective target positions and to cause the cause associated in advance with the evaluation content and estimated to lead to the position differences to be displayed in a case in which the feature points for the positioning that the object has are moved while being positioned at the plurality of respective target positions.

According to the disclosure, it is possible to cause the aforementioned estimated cause and the countermeasure for addressing the cause to be displayed.

According to the disclosure, it is possible to use the plurality of detected positions detected by being moved to the target positions a plurality of times as the detected positions associated with the respective target positions.

According to the disclosure, it is possible to use the aforementioned statistical values as the detection differences.

According to the disclosure, it is possible to use at least one of the average value, the maximum value, the minimum value, and the variation of the differences from the plurality of respective detected positions as the statistical values of the detection differences.

According to the disclosure, it is possible to display at least one of the condition for driving the moving mechanism, the parameter for the image processing, and the condition for imaging.

According to the disclosure, it is possible to cause the detected position of the feature portion detected from the image data acquired by imaging the object that has moved to the respective target positions to be displayed in association with the target positions in the same coordinate space in a case in which the object is moved by the moving mechanism while the feature portion for positioning is positioned at the plurality of respective target positions.

According to the present disclosure, it is possible to cause the detected portions of the feature portion detected from the image data acquired by imaging the object that has moved to the respective target positions to be displayed in association with the target positions in the same coordinate space in a case in which the object is moved by the moving mechanism while the feature portion for positioning is positioned at the plurality of respective target positions if the program is executed.

According to an example of the present disclosure, it is possible to provide an environment which provides information for supporting adjustment of the respective parts for positioning.

An embodiment of the present disclosure will be described in detail with reference to the drawings. Note that the same reference numerals will be applied to the same or corresponding parts in the drawings and description thereof will not be repeated;

A. APPLICATION EXAMPLE

First, an example of a scenario to which the present disclosure is applied will be described with reference to FIG. 1. FIG. 1 is a diagram schematically illustrating an example of a scenario to which a position detecting apparatus 100 according to an embodiment is applied. Calibration, for example, is performed in the position detecting apparatus 100 according to the embodiment. The calibration is performed when the position detecting apparatus 100 is actually operated for alignment, for example.

In the calibration, the position of an arbitrary object that is moved by a moving mechanism (for example, a servo motor 300, which will be described later, or the like) is detected. The position detecting apparatus 100 can be assembled in a visual sensor, for example. The moving mechanism can include various actuators such as a servo motor 300, which will be described later, for example. The object can include a workpiece or the like that can be a target of an inspection using image processing performed by the visual sensor during the actual operation, for example.

As illustrated in FIG. 1, the position detecting apparatus 100 includes an image storage unit 60 that stores image data 10 acquired by imaging the object when the feature portion is positioned at a plurality of respective target positions 21 by the moving mechanism configured to change the position of the object in which a feature portion (for example, a mark 14, which will be described later, or the like) for positioning is provided, an image processing unit 50, a position storage unit 80, and a display data generation unit 85. The aforementioned feature portion for positioning is more typically a target mark of the calibration, and a dedicated target mark for the calibration or the like may be used. Alternatively, a feature portion for a positioning operation may be used.

The image processing unit 50 detects the positions of the feature portion that is included in the image data 10 from the captured image data 10 through image processing. The position storage unit 80 stores the detected positions (that is, sampling positions 20) detected from the image data 10 of the object positioned at the respective target positions 21 through the aforementioned image processing in association with the target positions 21. The display data generation unit 85 generates data for displaying the respective target positions 21 and the respective detected positions (sampling positions 20) stored in association with the target positions 21 in the same coordinate space on a display unit. The aforementioned coordinate space on the display unit can include a two-dimensional coordinate space of multidimensional axes, for example, an X axis and a Y axis, or a coordinate space of a one-dimensional axis, namely, an X axis (Y axis).

In addition, a command unit 95 controls the moving mechanism such that the feature portion of the object is positioned at the respective target positions 21 by providing a control command 96 to the moving mechanism (for example, the servo motor 300 or the like) by using the plurality of target positions 21. The control command 96 can correspond to a control command (for example, a drive pulse or the like) to the servo motor 300, for example. The image acquisition unit 40 acquires the image data 10 imaged by a camera 104 via an image buffer 122a, which will be described later, in synchronization with an output of the control command 96. In this manner, the position detecting apparatus 100 can acquire the image data 10 imaged by the camera 104 every time the object moves to the respective target positions 21.

In the position detecting apparatus 100 according to the embodiment, the target positions 21 and the detected position of the feature portion detected in a case in which the object is moved by the moving mechanism such that the feature portion is positioned at the target positions can be acquired and can be displayed in the same coordinate space in the associated manner. In this manner, it is possible to present relative positional relationships between the respective target positions 21 and the detected positions (sampling positions 20), which have been detected through the image processing, of the feature portion moved to be positioned at the respective target positions to a user. The positional relationships can include errors of the detected positions from the target positions 21. Therefore, the position detecting apparatus 100 can provide the presented positional relationships as information for supporting adjustment in a case in which the user adjusts setting or imaging conditions (illumination, an imaging posture (angle), and the like) for the moving mechanism or the image processing, for example.

In addition, the position detecting apparatus 100 according to the embodiment includes a cause storage unit 90 that stores a plurality of predefined cause data items Ri (i=1, 2, 3, . . . ) that have evaluation content RA that represents evaluation of the positional differences that are differences from the target positions 21 in the coordinate system and an estimated cause RB estimated for the positional differences in linkage with the evaluation content, and an evaluation unit 70 that evaluates differences between the target positions 21 and the associated detected positions in the coordinate system in the position storage unit 80 with a predefined reference (corresponding to reference data 35). In the embodiment, the aforementioned coordinate system is an actual coordinate system (unit: mm) obtained by transforming a camera coordinate system (unit: pix (pixels)) obtained by imaging by using a function (affine transformation, distortion correction, or the like), for example. In addition, the amount (unit: mm) of movement of the moving mechanism, for example, can be expressed by the amount of movement in the actual coordinate system in the embodiment. The display data generation unit 85 generates data for displaying, on the display unit, the estimated cause RB, which corresponds to the evaluation content RA that represents the evaluation by the evaluation unit 70, in the cause storage unit 90.

Although the image storage unit 60, the position storage unit 80, and the cause storage unit 90 correspond to, for example, a storage region such as a RAM 112 in FIG. 3, which will be described later, in the embodiment, the image storage unit 60, the position storage unit 80, and the cause storage unit 90 are not limited to the RAM 112.

The position detecting apparatus 100 according to the embodiment can evaluate the differences of the detected positions (sampling positions 20) from the target positions 21 with a predefined reference as errors in the detection. The evaluation result can be displayed as a cause estimated to cause the errors on the display unit. In the embodiment, the estimated cause can include a condition for driving the moving mechanism, a parameter for image processing, a condition for imaging, or the like. In this manner, the position detecting apparatus 100 can provide the estimated cause to be displayed as information for supporting adjustment of the setting of the correction parameter, the imaging condition, or the like for the moving mechanism or the image processing, for example, by the user.

Hereinafter, a more detailed configuration and processing of the position detecting apparatus 100 according to the embodiment will be described as a more specific application example of the present disclosure.

B. OVERALL CONFIGURATION EXAMPLE OF POSITION CONTROL SYSTEM

Figure 2:
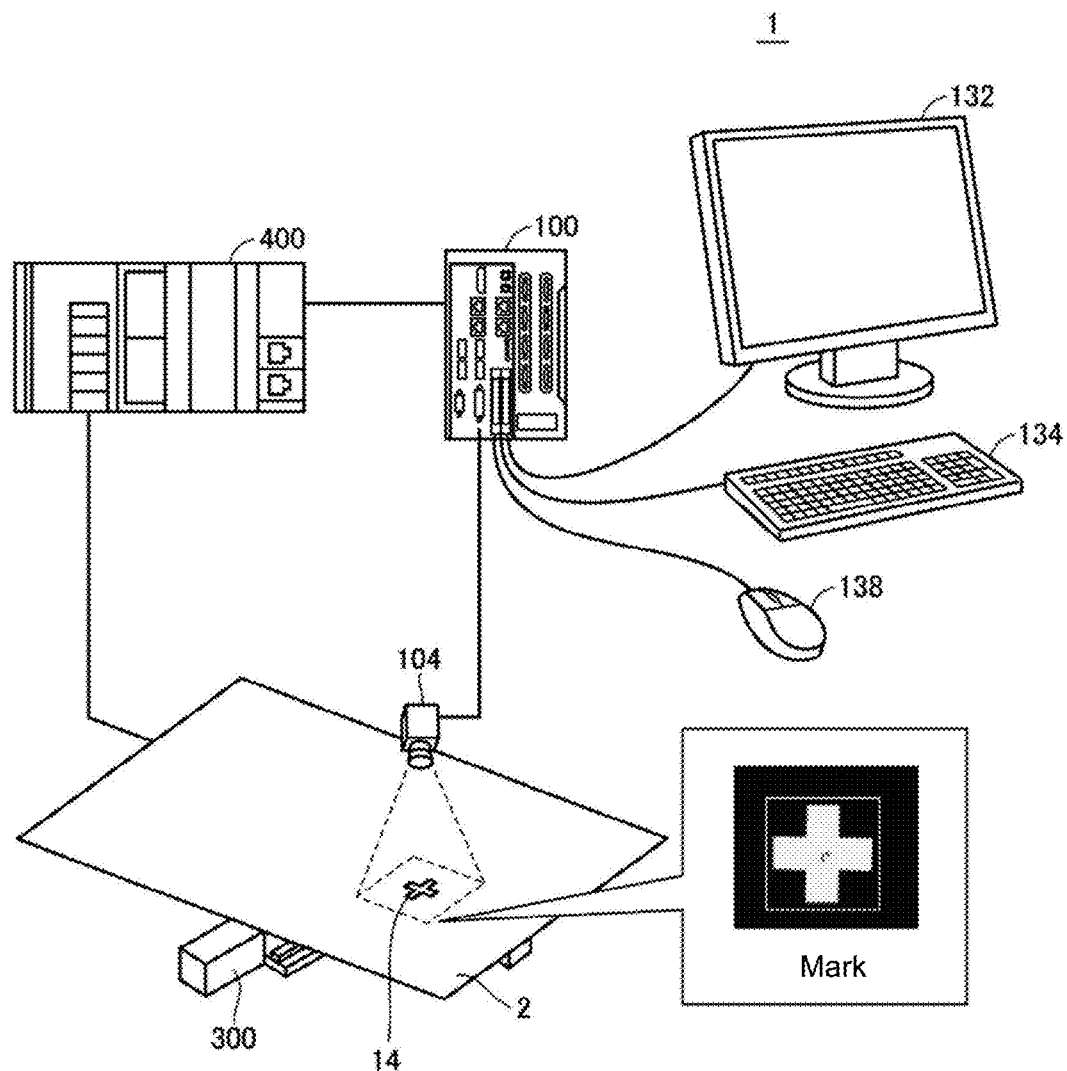
FIG. 2 is a diagram illustrating an overall configuration of a position control system 1 according to the embodiment.

FIG. 2 is a diagram illustrating an overall configuration of the position control system 1 according to the embodiment. Referring to FIG. 2, the position control system 1 performs alignment by using image processing when the position control system 1 is actually operated in a production line of industrial products or the like. The alignment typically means processing of arranging workpieces at original positions on the production line. A workpiece 4 has a feature portion for positioning. In an example of such alignment, the position control system 1 specifies a feature image that is a partial image corresponding to the feature portion from image data obtained by imaging an object (workpiece 4) arranged on an upper surface of a stage 2, detects the position of the specified feature image, and arranges (positions) the workpiece 4 at an accurate position by controlling the stage 2 on the basis of the detected position data (position coordinates in the embodiment).

As illustrated in FIG. 2, the position control system 1 includes the position detecting apparatus 100, a motion controller 400, and the stage 2. The position detecting apparatus 100 acquires image data imaged by the camera 104 and detects the position of the mark 14 for positioning that is included in the acquired image data, thereby specifying the position of the feature portion in the workpiece 4. The camera 104 can include a charge coupled device (CCD) camera, for example. The position detecting apparatus 100 outputs a command for arranging the workpiece 4 at an accurate position on the basis of the specified positions to the motion controller 400.

The motion controller 400 provides a command to the stage 2 in accordance with the control command 96 from the position detecting apparatus 100, thereby realizing alignment of the workpiece 4.

The stage 2 may have any degree of freedom as long as the stage 2 is a mechanism capable of arranging the workpiece 4 at the accurate position. In the embodiment, the stage 2 can provide displacement in the horizontal direction and displacement of rotation, for example, to the workpiece 4.

C. OVERALL CONFIGURATION OF POSITION DETECTING APPARATUS

Figure 3:
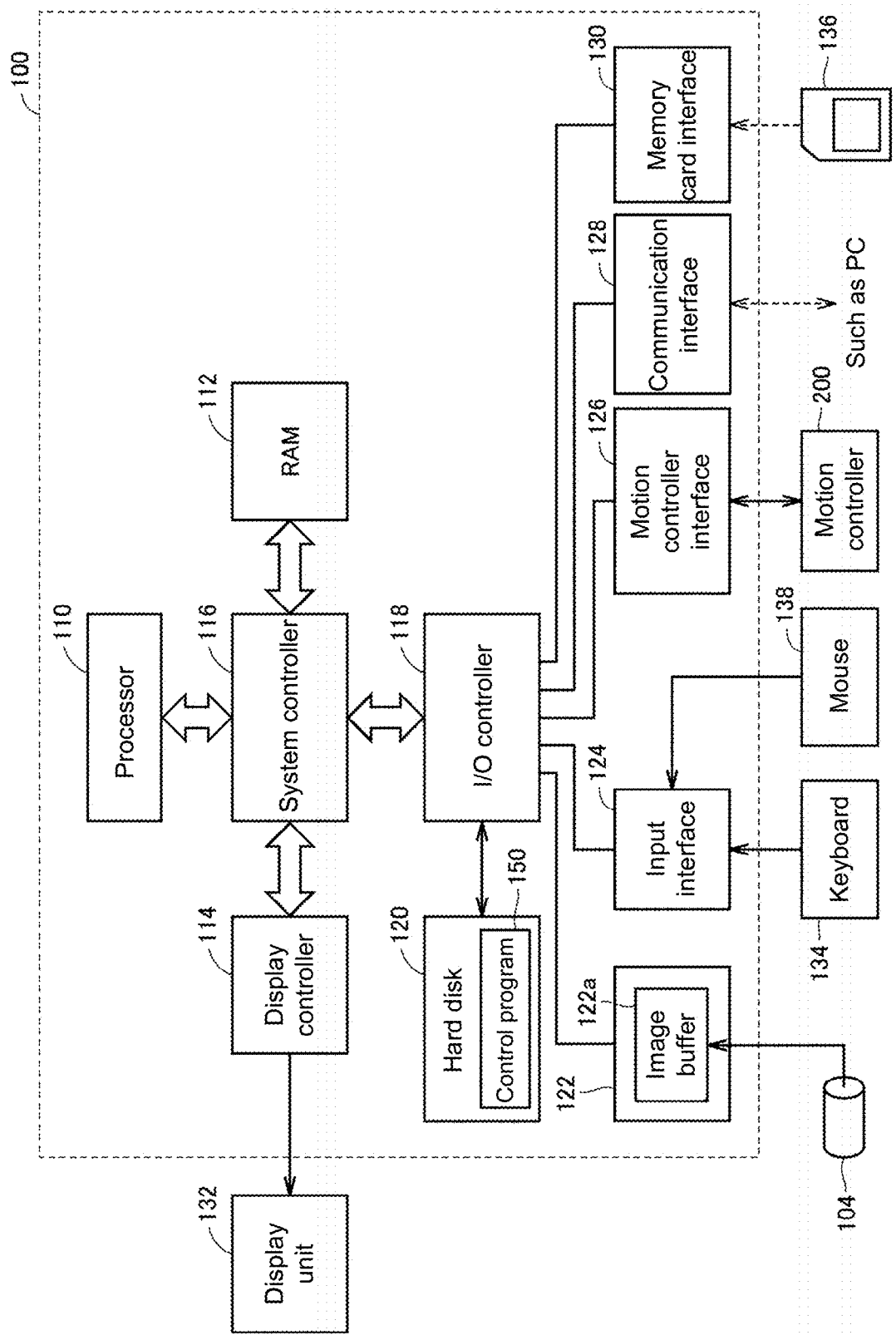
FIG. 3 is a diagram illustrating a hardware configuration of the position detecting apparatus 100 according to the embodiment.

FIG. 3 is a diagram illustrating a hardware configuration of the position detecting apparatus 100 according to the embodiment. As illustrated in FIG. 3, the position detecting apparatus 100 typically has a structure that is compatible with a general-purpose computer architecture and realizes various kinds of processing as will be described later by a processor executing a program installed in advance.

More specifically, the position detecting apparatus 100 includes a processor 110 such as a central processing unit (CPU) or a micro-processing unit (MPU), a random access memory (RAM) 112, a display controller 114, a system controller 116, an input/output (I/O) controller 118, a hard disk 120, a camera interface 122, an input interface 124, a motion controller interface 126, a communication interface 128, and a memory card interface 130. These respective parts are connected around the system controller 116 at the center such that the respective parts can communicate with each other.

The processor 110 exchanges programs (codes) or the like with the system controller 116 and executes them in a predetermined order, thereby realizing target arithmetic processing.

The system controller 116 is connected to the processor 110, the RAM 112, the display controller 114, and the I/O controller 118 via a bus, exchanges data and the like with the respective parts, and manages the entire processing performed by the position detecting apparatus 100.

The RAM 112 is typically a volatile storage device such as a dynamic random access memory (DRAM) and holds programs read from the hard disk 120, camera images (image data) acquired by the camera 104, data (manually input coordinates and the like) related to the image data, workpiece data, and the like.

The display controller 114 is connected to a display unit 132 and outputs a signal for displaying various kinds of information to the display unit 132 in accordance with an internal command, such as display data, from the system controller 116.

The I/O controller 118 controls exchange of data with a recording medium or an external device connected to the position detecting apparatus 100. More specifically, the I/O controller 118 is connected to the hard disk 120, the camera interface 122, the input interface 124, the motion controller interface 126, the communication interface 128, and the memory card interface 130.

The hard disk 120 is typically a non-volatile magnetic storage device, and various setting values and the like are stored therein in addition to the control program 150 such as algorithms executed by the processor 110. The control program 150 installed in the hard disk 120 is distributed in a state in which the control program 150 is stored in a memory card 136 or the like. Note that a semiconductor storage device such as a flash memory or an optical storage device such as a digital versatile disk random access memory (DVD-RAM) may be employed instead of the hard disk 120.

The camera interface 122 acquires the image data obtained by imaging the workpiece and relays data transfer between the processor 110 and the camera 104. The camera interface 122 includes an image buffer 122a for temporarily accumulating the image data from the camera 104.

The input interface 124 relays data transfer between the processor 110 and an input device such as a keyboard 134, a mouse 138, a touch panel, or a dedicated console.

The motion controller interface 126 relays data transfer between the processor 110 and the motion controller 400.

The communication interface 128 relays data transfer between the processor 110 and another personal computer, a server device, or the like, which are not illustrated in the drawing. The communication interface 128 is typically Ethernet (registered trademark), a universal serial bus (USB), or the like.

The memory card interface 130 relays data transfer between the processor 110 and the memory card 136 that is a recording medium. The memory card 136 is distributed in a state in which the control program or the like to be executed by the position detecting apparatus 100 is stored, and the memory card interface 130 reads the control program 150 from the memory card 136. The memory card 136 is a general-purposed semiconductor storage device such as a secure digital (SD), a magnetic recording medium such as a flexible disk, an optical recording medium such as a compact disk read only memory (CD-ROM), or the like. Alternatively, a program downloaded from a distribution server or the like may be installed in the position detecting apparatus 100 via the communication interface 128.

In a case in which a computer that has a structure compatible with the aforementioned computer architecture is used, an operating system (OS) for providing basic functions of a computer may be installed in addition to an application for providing the functions according to the embodiment. In this case, the control program according to the embodiment may be a program for executing processing by calling necessary modules from among program modules provided as a part of the OS in a predetermined order and/or a predetermined timing.

Further, the control program 150 according to the embodiment may be provided by being assembled as a part of another program. The program itself does not include modules included in another program to be combined as described above, and the processing is executed in cooperation with another program even in that case. That is, the control program 150 according to the embodiment may be in a form in which the control program 150 is assembled in such another program.

Note that a part or entirety of the functions provided by executing the control program 150 may be mounted on a dedicated hardware circuit such as an application specific integrated circuit (ASIC) or a field-programmable gate array (FPGA) instead.

D. OVERALL CONFIGURATION OF MOTION CONTROLLER

Figure 4:
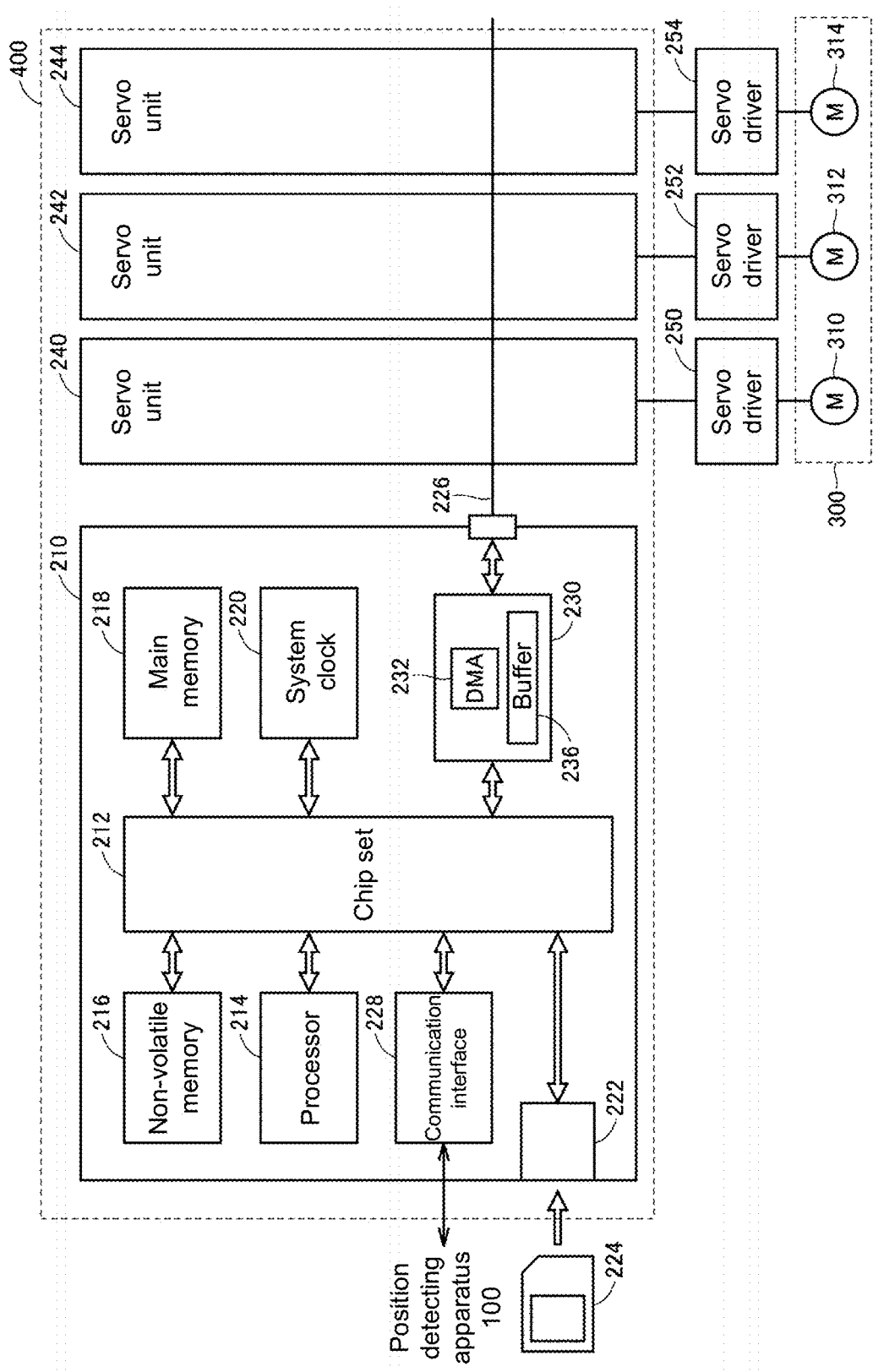
FIG. 4 is a diagram illustrating a hardware configuration of a motion controller 400 according to the embodiment.

FIG. 4 is a diagram illustrating a hardware configuration of the motion controller 400 according to the embodiment. As illustrated in FIG. 4, the motion controller 400 includes a main control unit 210 and a plurality of servo units 240, 242, and 244. An example in which the stage 2 has servo motors 310, 312, and 314 corresponding to three axes is illustrated, and the servo units 240, 242, and 244, the number of which corresponds to the number of axes, are included in the motion controller 400 in the position control system 1 according to the embodiment. In a case in which the servo motors 310, 312, and 314 are not particularly distinguished, the servo motors 310, 312, and 314 will be collectively referred to as servo motors 300 in the embodiment.

The main control unit 210 manages overall control of the motion controller 400. The main control unit 210 is connected to the servo units 240, 242, and 244 via an internal bus 226 and exchanges data with each other. The servo units 240, 242, and 244 output control commands (typically, drive pulses and the like) to servo drivers 250, 252, and 254, respectively, in accordance with an internal command or the like from the main control unit 210. The servo drivers 250, 252, and 254 drive the servo motors 310, 312, and 314 connected thereto, respectively.

The main control unit 210 includes a chip set 212, a processor 214, a non-volatile memory 216, a main memory 218, a system clock 220, a memory card interface 222, a communication interface 228, and an internal bus controller 230. The chip set 212 and other components are linked to each other via various buses.

The processor 214 and the chip set 212 typically have configurations that are compatible with a general-purposed computer architecture. That is, the processor 214 interprets and executes order codes that are sequentially supplied from the chip set 212 in accordance with an internal clock. The chip set 212 exchanges internal data with various components connected thereto and generates order codes necessary for the processor 214. The system clock 220 generates a system clock of a predefined cycle and supplies the system clock to the processor 214. The chip set 212 has a function of caching data and the like obtained as a result of executing arithmetic processing by the processor 214.

The main control unit 210 has the non-volatile memory 216 and the main memory 218. The non-volatile memory 216 holds an OS, a system program, a user program, data definition information, log information, and the like in a non-volatile manner. The main memory 218 is a volatile storage display region, holds various programs to be executed by the processor 214, and is also used as a working memory during execution of the various programs.

The main control unit 210 has the communication interface 228 and the internal bus controller 230 as communication portions. These communication circuits transmit and receive data.

The communication interface 228 exchanges data with the position detecting apparatus 100. The internal bus controller 230 controls the exchange of data via the internal bus 226. More specifically, the internal bus controller 230 includes a buffer memory 236 and a dynamic memory access (DMA) control circuit 232.

The memory card interface 222 connects a detachable memory card 224 and the chip set 212 to the main control unit 210.

E. RELATIONSHIP BETWEEN CAMERA COORDINATE SYSTEM AND ACTUAL COORDINATE SYSTEM

FIGS. 5 to 12 are explanatory diagrams of a relationship between the camera coordinate system and an actual coordinate system according to the embodiment. In the embodiment, processing of transforming the camera coordinate system (unit: pix pixels) that is a two-dimensional coordinate system that is defined by image data imaged by the camera 104 in the field of view of the camera in FIG. 5 into an actual coordinate system is performed.

In the embodiment, the actual coordinate system is an XY two-dimensional coordinate system (unit: mm) in which the stage 2 (or the workpiece 4) moves with the amount of movement (the moving direction, the distance, and the like) changed due to the amount of rotation (the rotation direction, the rotation angle, and the like) of the servo motors 300 that are moving mechanisms. Note that although the actual coordinate system and the camera coordinate system are virtual coordinate spaces defined by two-dimensional coordinate axes (XY axes) in the embodiment, the actual coordinate system and the camera coordinate system may be coordinate spaces defined by multidimensional coordinate axes (XYZ axes and the like) of three or more dimensions.

In calibration according to the embodiment, detecting the position of the object by the image processing unit 50 from the image data imaged and acquired is also referred to as "sampling", and the detected positions (unit: pix) are also referred to as "sampling points".

Figure 6:
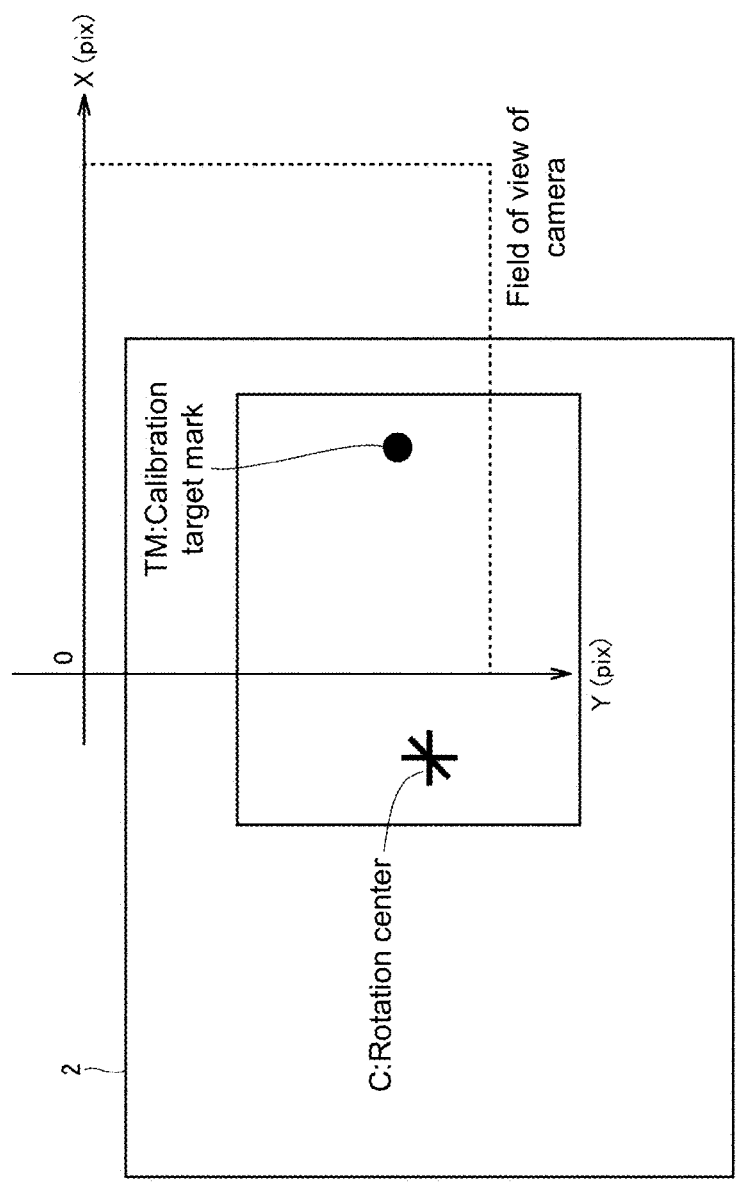
FIG. 6 is an explanatory diagram of a relationship between the camera coordinate system and the actual coordinate system according to the embodiment.
Figure 7:
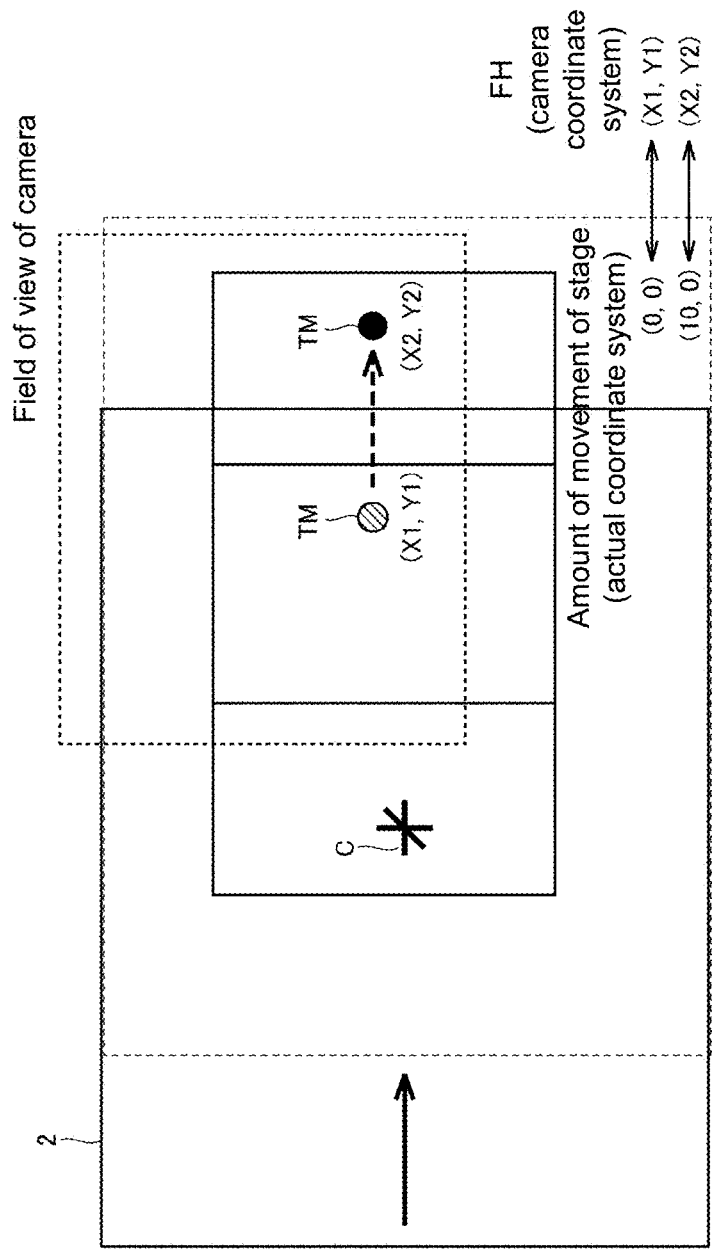
FIG. 7 is an explanatory diagram of a relationship between the camera coordinate system and the actual coordinate system according to the embodiment.

First, the camera coordinate system of parallel movement will be described. If the servo motors 310, 312, and 314 are driven by an internal command from the main control unit 210, and the stage 2 is moved in the X direction in parallel by the predefined amount (unit: mm) of movement of the stage in a state in which a mark TM is arranged at a reference position on the stage 2 as illustrated in FIG. 6, the position of the mark TM in the camera coordinate system moves from the reference position (X1, Y1) to the position (X2, Y2) (see FIG. 7).

Figure 8:
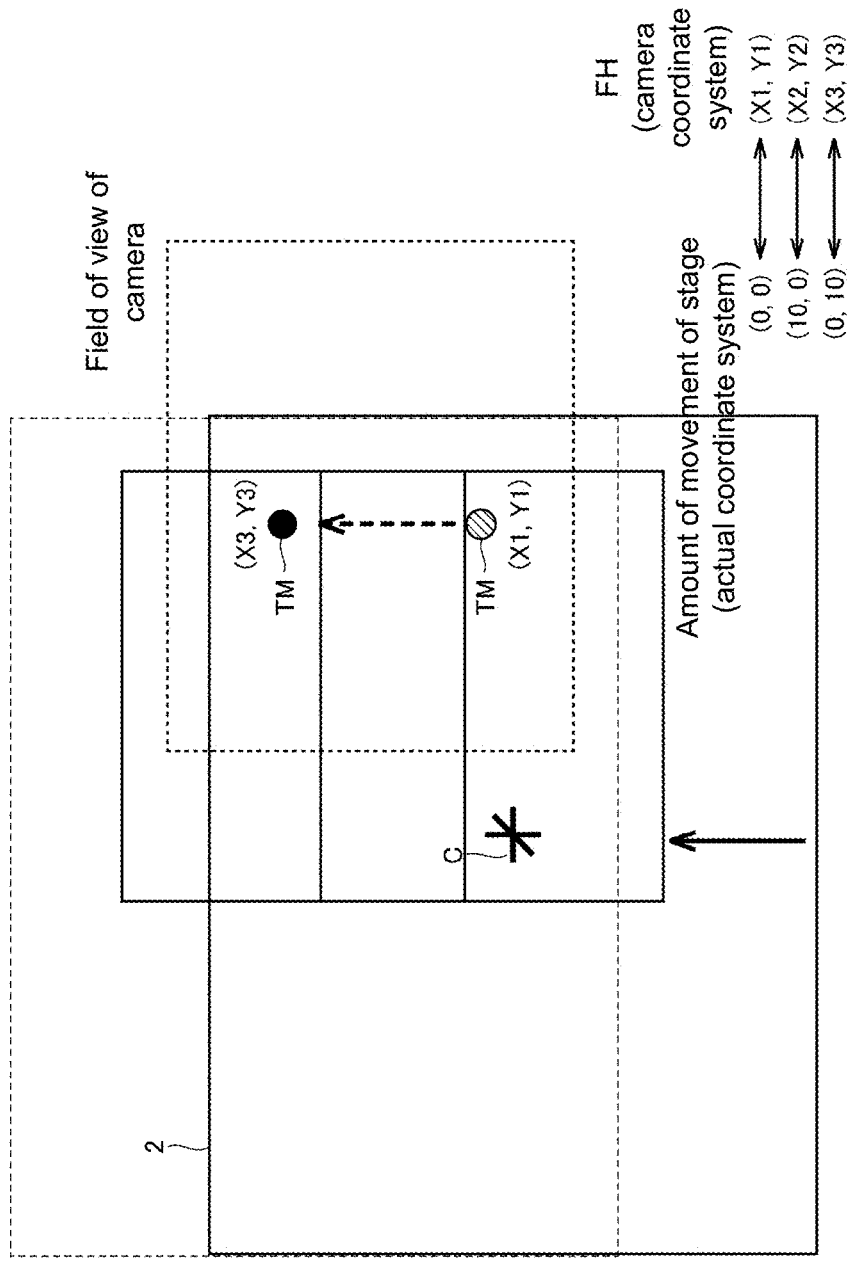
FIG. 8 is an explanatory diagram of a relationship between the camera coordinate system and the actual coordinate system according to the embodiment.
Figure 9:
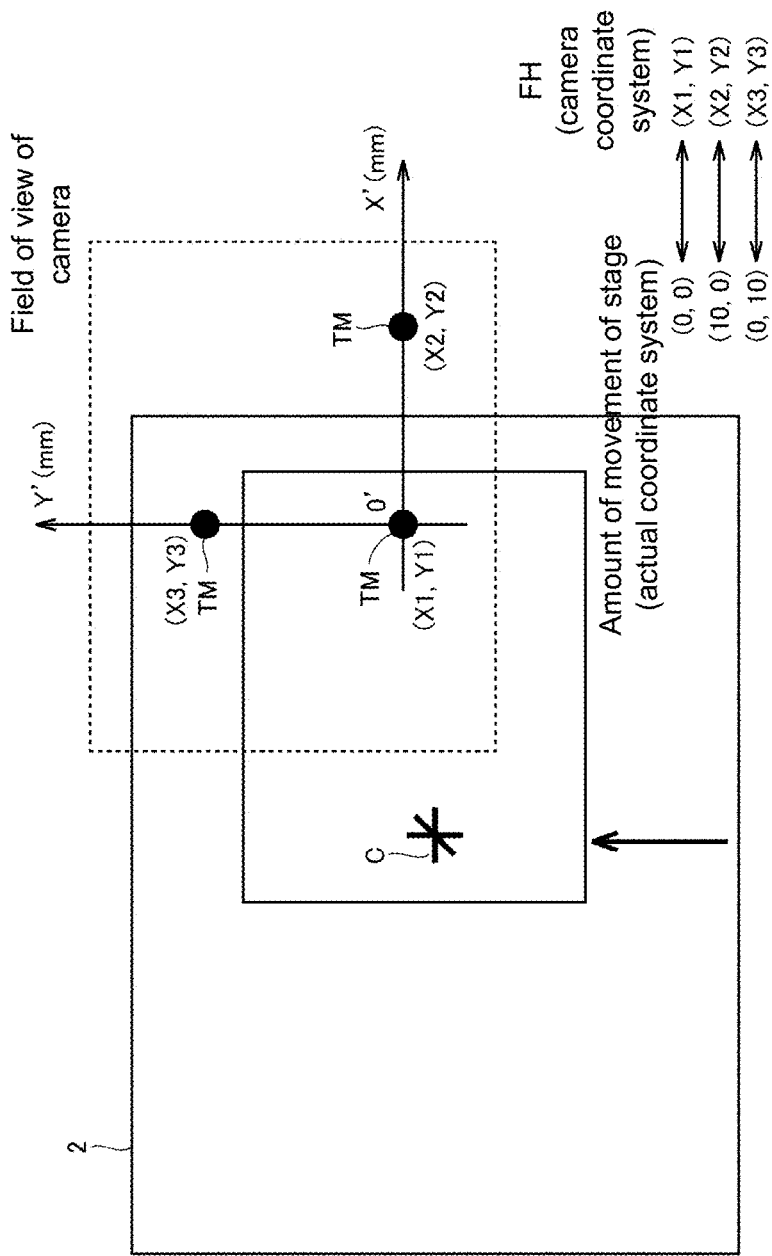
FIG. 9 is an explanatory diagram of a relationship between the camera coordinate system and the actual coordinate system according to the embodiment.

Similarly, if the stage 2 is caused to be moved in parallel in the Y direction by the predefined amount (unit: mm) of movement of the stage, the mark TM in the camera coordinate system moves from the reference position (X1, Y1) to the position (X3, Y3) (see FIG. 8). In this manner, the camera coordinate system (see FIG. 9) of the parallel movement is generated.

Figure 10:
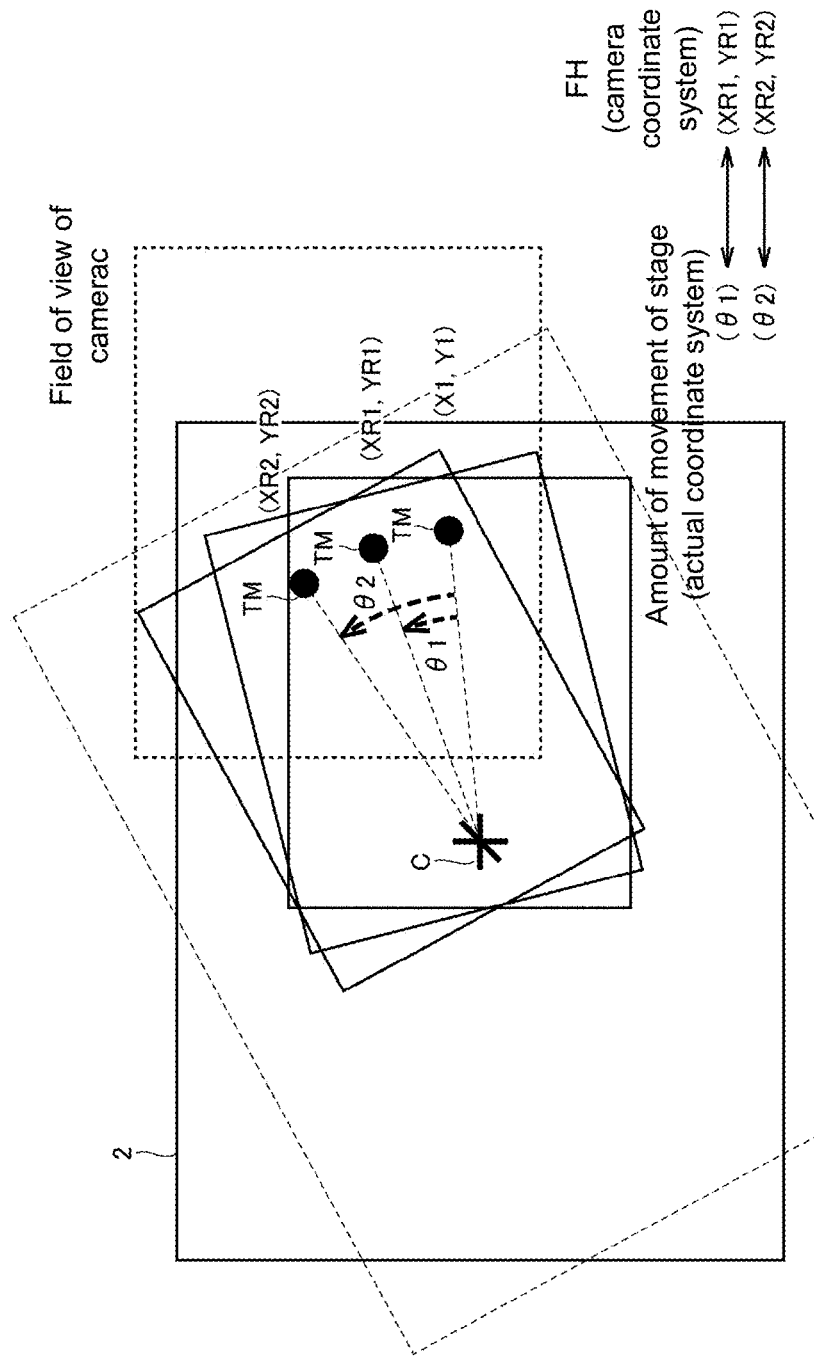
FIG. 10 is an explanatory diagram of a relationship between the camera coordinate system and the actual coordinate system according to the embodiment.
Figure 11:
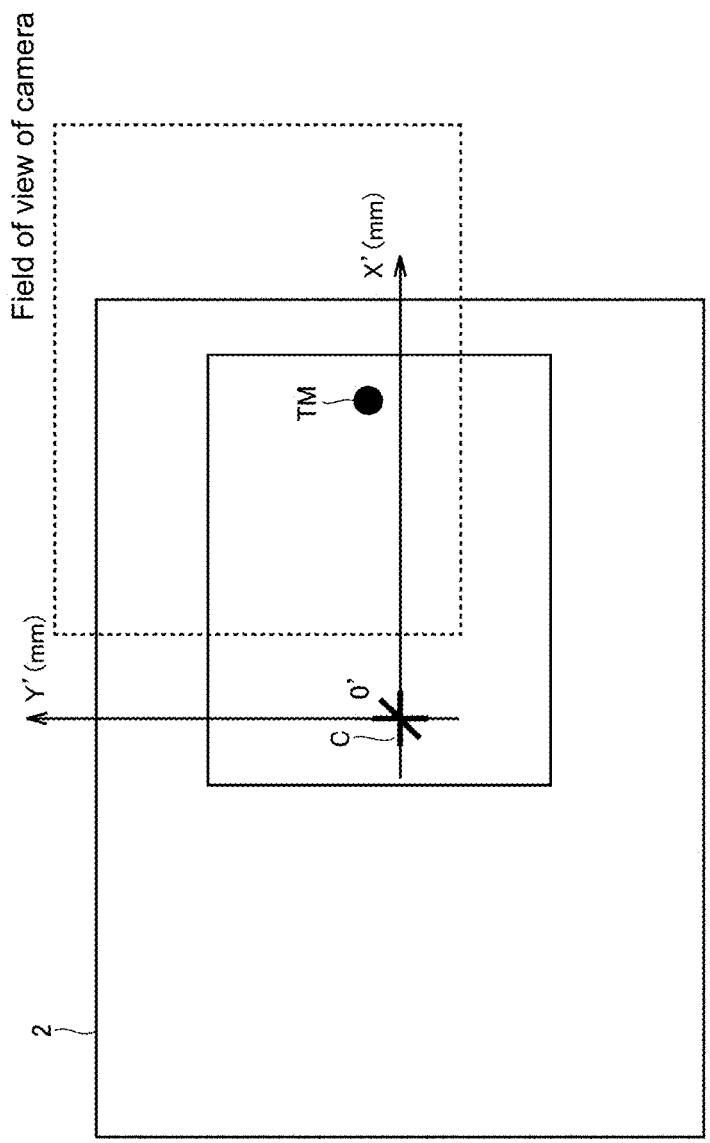
FIG. 11 is an explanatory diagram of a relationship between the camera coordinate system and the actual coordinate system according to the embodiment.

Next, the camera coordinate system of rotation movement as illustrated in FIGS. 10 and 11 will be described. First, if the servo motors 310, 312, and 314 are driven by an internal command from the main control unit 210, and the stage 2 is rotationally moved in a horizontal plane by a predefined amount of movement (angles θ1 and θ2) in a state in which the mark TM is arranged at the reference position on the stage 2 as illustrated in FIG. 10, the mark TM in the camera coordinate system moves from the reference position (X1, Y1) to the position (XR1, YR1) and then to the position (XR2, YR2) (see FIG. 10).

The image processing unit 50 calculates coordinates of a rotation center C of the camera coordinate system from the angles θ1 and θ2 and the positions (X1, Y1), (XR1, YR1), and (XR2, YR2). The image processing unit 50 moves an origin of the camera coordinate system to the aforementioned rotation center C. In this manner, the camera coordinate system of the rotation movement in FIG. 11 in consideration of the rotation center is generated.

Figure 12:
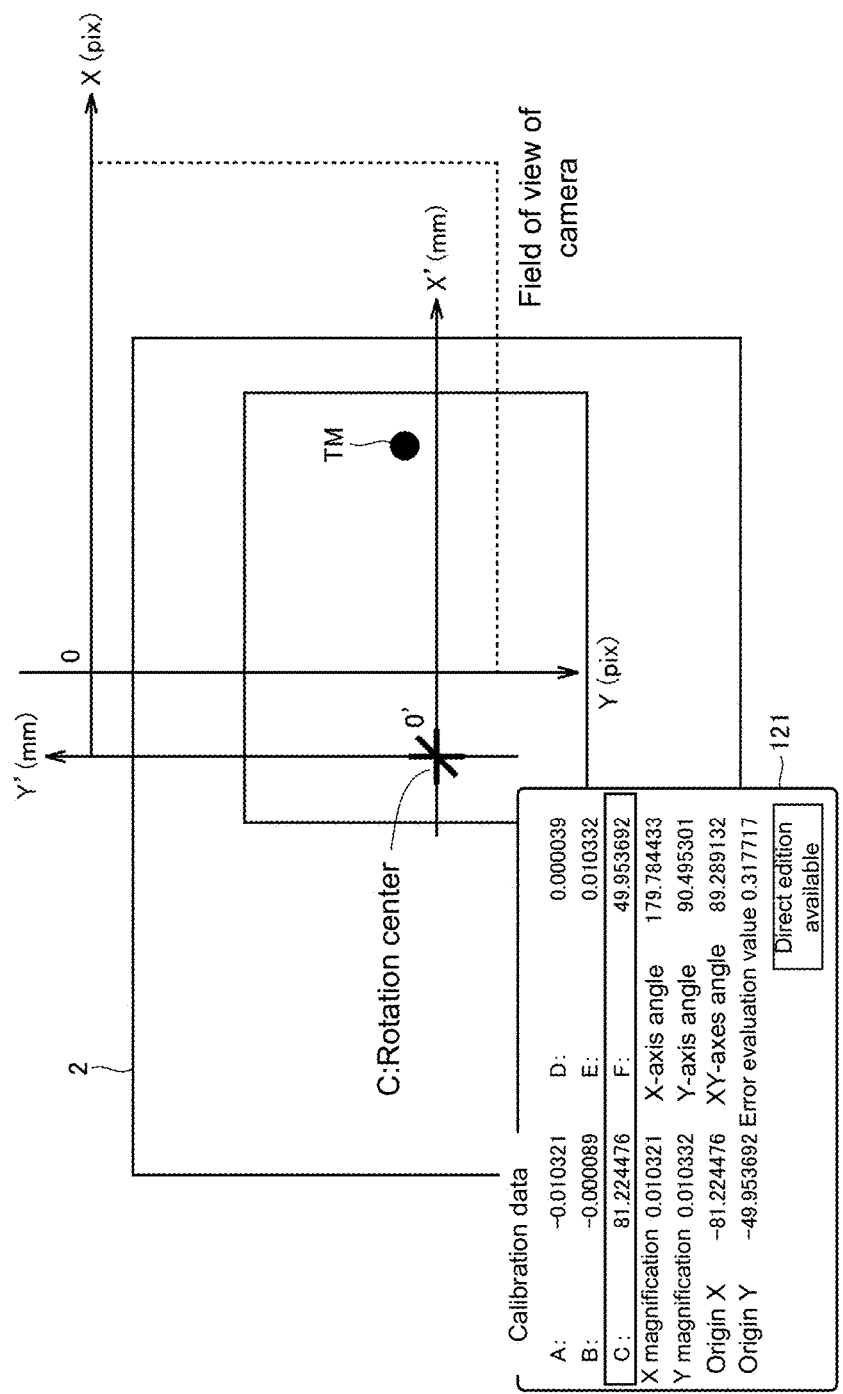
FIG. 12 is an explanatory diagram of a relationship between the camera coordinate system and the actual coordinate system according to the embodiment.

The relationship between the camera coordinate system and the actual coordinate system according to the embodiment is schematically illustrated in FIG. 12. In a case in which the stage 2 (or the workpiece 4) is moved in parallel by the moving mechanism, the image processing unit 50 detects the position (unit: pix) of the mark 14 in the camera coordinate system in FIG. 9 and transforms the detected position into the position (unit: mm) in the actual coordinate system in FIG. 12. In this manner, the sampling position (unit: mm) of the mark 14 in the actual coordinate system is detected, and it becomes possible to compare the sampling position (unit: mm) with the target position (unit: mm) of the mark 14 in the actual coordinate system.

In addition, in a case in which the stage 2 (or the workpiece 4) is rotationally moved by the moving mechanism, the image processing unit 50 detects the position (unit: pix) of the mark 14 in the camera coordinate system in FIG. 11 and transforms the detected position into the position (unit: mm) in the actual coordinate system in FIG. 12. In this manner, the sampling position (unit: mm) of the mark 14 in the actual coordinate system is detected, and it becomes possible to compare the sampling position (unit: mm) with the target position (unit: mm) of the mark 14 in the actual coordinate system.

In the embodiment, the image processing unit 50 uses predefined function, for example, a function for correcting various kinds of distortion such as affine transformation, trapezoidal distortion correction, and lens distortion correction for mapping (that is, correcting) the camera coordinate system in the actual coordinate system in order to transform the camera coordinate system into the actual coordinate system as described in FIGS. 5 to 12. Note that the correction function to be applied to the transformation is not limited thereto.

FIG. 12 illustrates an example of a parameter table 121 according to the embodiment. A parameter table 121 includes parameters used for the aforementioned correction function. The parameter table 121 can be displayed on the display unit 132 and can switch a parameter setting pattern by changing values of the parameter in the parameter table 121 through a user's operation of the keyboard 134 or the like. The image processing unit 50 calculates the sampling position in accordance with the parameter setting pattern and the aforementioned function. In this manner, it is possible to cause precision in detecting the sampling position to be improved by changing the setting pattern.

F. CALIBRATION PROCESSING AND PROCESSING DURING OPERATION

Figure 13:
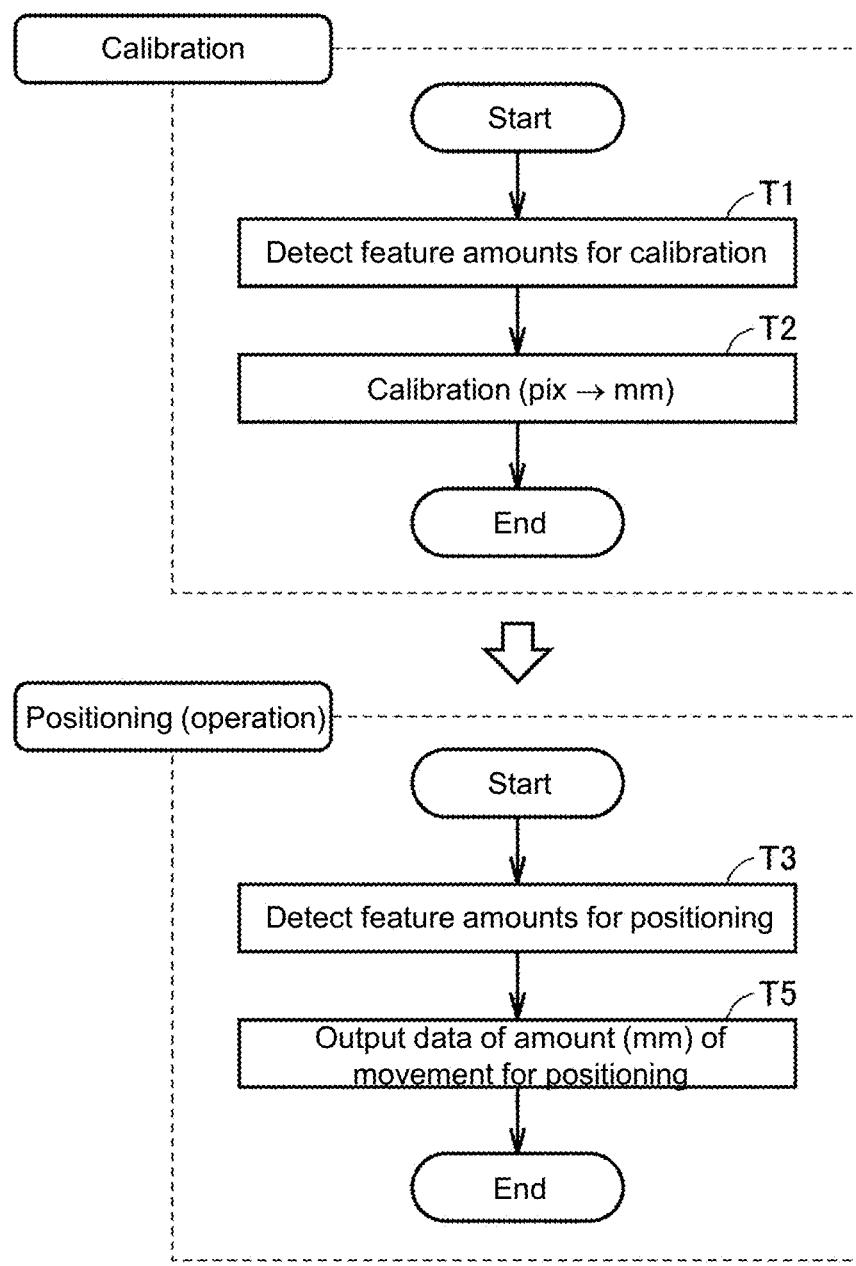
FIG. 13 is an explanatory flowchart illustrating calibration processing in association with positioning processing when executed, according to the embodiment.
Figure 14:
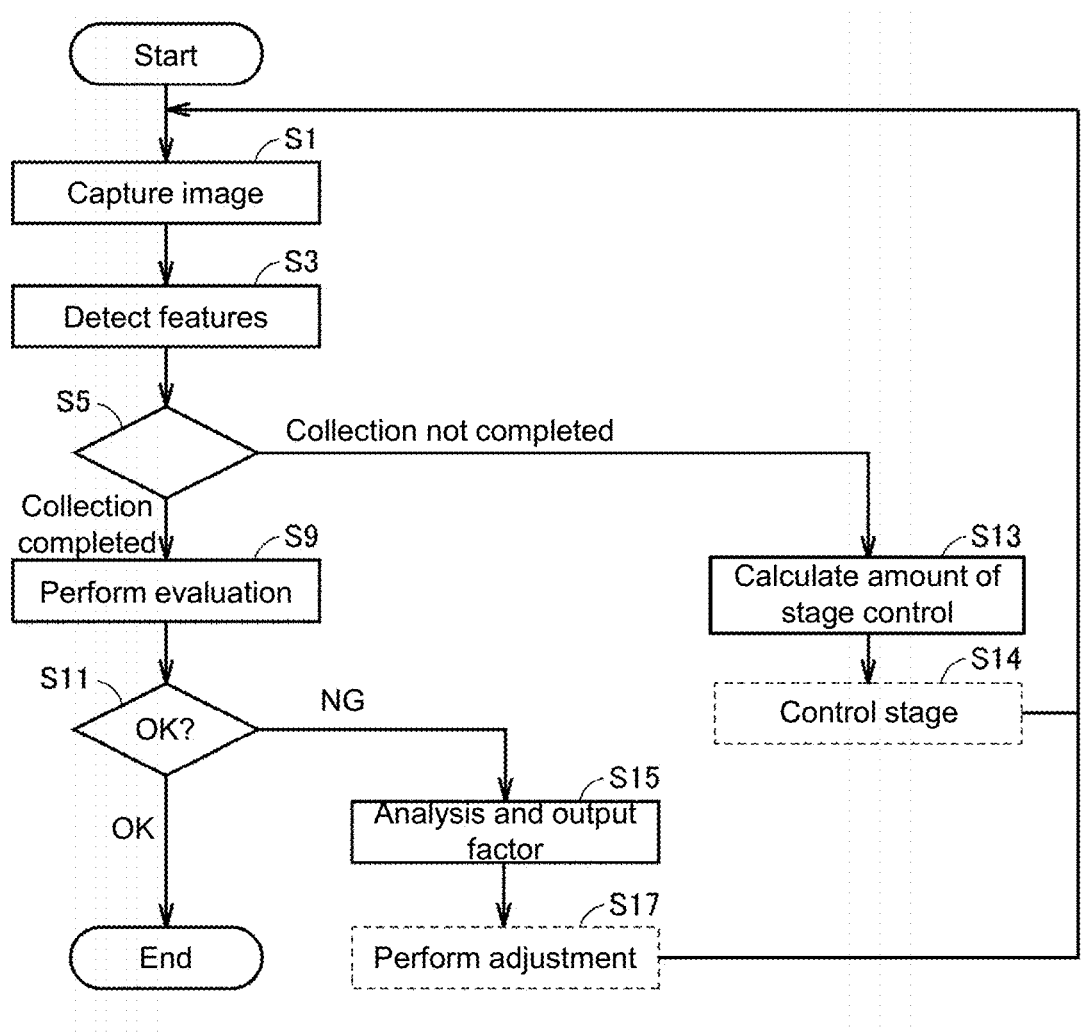
FIG. 14 is an explanatory flowchart illustrating the calibration processing in FIG. 13 in association with other processing.

FIG. 13 is an explanatory outline flowchart of calibration processing and positioning processing during operations including the calibration according to the embodiment. FIG. 14 is an explanatory flowchart illustrating the calibration processing in FIG. 13 in association with other processing. Referring to FIG. 13, if the calibration processing (Steps T1 and T2) according to the embodiment is performed, and the calibration is completed, the position control system 1 is actually operated.

In addition, the calibration may be performed in processing (Steps T3 and T5) for the actual operations. A program that follows the flowchart in FIG. 13 or 14 can be included in the control program 150.

(F-1. Calibration Processing)

Figure 5:
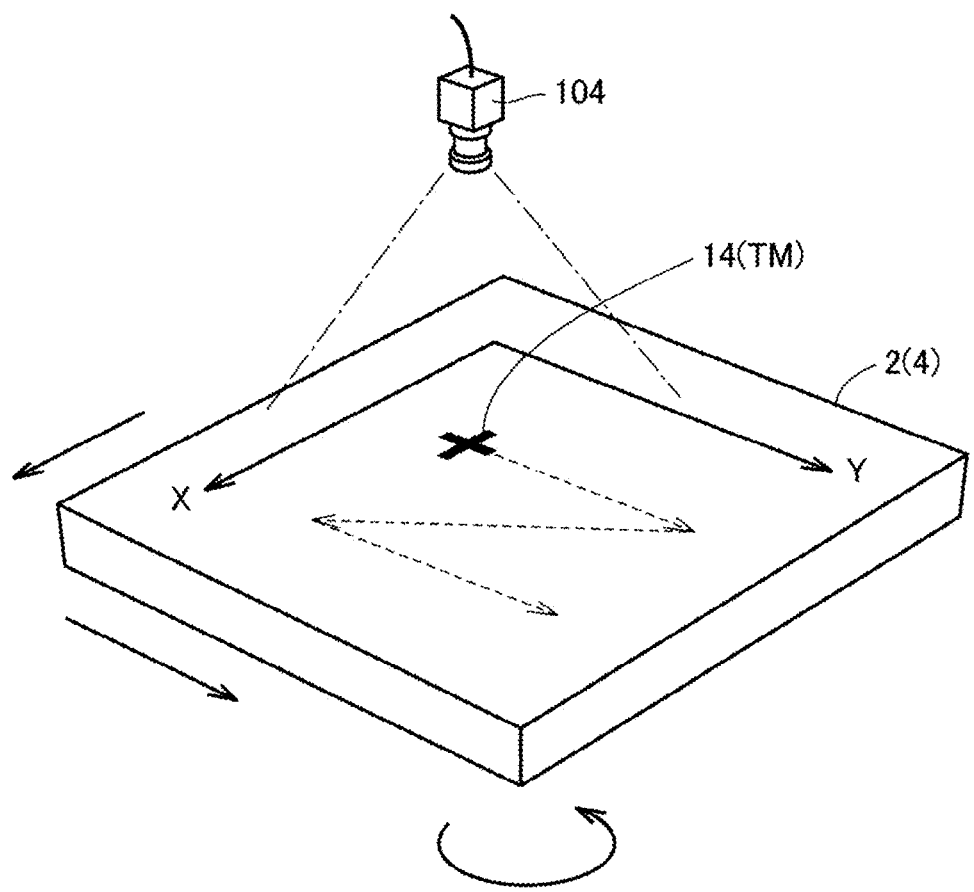
FIG. 5 is an explanatory diagram of a relationship between a camera coordinate system and an actual coordinate system according to the embodiment.

FIG. 14 illustrates the calibration processing along with other processing (evaluation processing (Step S9), cause analysis and output processing (Step S15), and adjustment processing (S17)) related to the calibration. In the calibration processing in FIG. 14, the sampling is performed at the respective target positions 21 while the workpiece 4 that has the mark 14 as the feature amount is imaged by the camera 104 as illustrated in FIG. 5 and the mark 14 of the workpiece 4 is moved to the predefined plurality of respective target positions 21 in the actual coordinate system by the moving mechanism.

Specifically, the workpiece 4 is imaged by the camera 104 (Step S1) when the workpiece is moved to the target position 21 by the moving mechanism, the image acquisition unit 40 acquires the image data 10 imaged and obtained, the image processing unit 50 specifies the feature portion (mark 14) from the acquired image data 10 through image processing such as pattern matching, detects the position of the specified feature portion in the camera coordinate system, and transforms the detected position into the sampling position 20 in the actual coordinate system in accordance with the aforementioned mapping function and the parameter setting pattern (Step S3). In addition, the position detecting apparatus 100 stores the sampling position 20 in association with the corresponding target position 21 and the feature image 22 of the specified feature portion (mark 14) in the position storage unit 80, and stores the image data 10 in association with the sampling position 20 in the image storage unit 60. In this manner, the imaged image data 10, the feature image 22 specified from the image data 10, the sampling position 20, and the corresponding target position 21 are mutually stored in association every time the workpiece 4 moves to the target position 21.

The position detecting apparatus 100 determines whether or not a predefined plurality of samplings for the calibration have been performed (Step S5). If it is determined that the predefined plurality of samplings have not ended, ("COLLECTION NOT ENDED" in Step S5), the position detecting apparatus 100 calculates the amount of control, such as the amount of movement of the stage 2 to the next target position 21 (Step S13), and outputs a moving command including the calculated amount of movement to the motion controller 400 (Step S14). In the motion controller 400, the moving mechanism is driven by the control command in accordance with the moving command, and the workpiece 4 moves to the next target position 21. Thereafter, the processing returns to Step S1, and the processing in and after Step S3 is performed.

Meanwhile, if the position detecting apparatus 100 determines that the predefined plurality of samplings have ended ("COLLECTION ENDED" in Step S5), the evaluation unit 70 performs evaluation processing of evaluating the sampling position 20 stored in association with the target position 21 in the position storage unit 80 by using reference data 35 (Step S9). The evaluation processing is processing of evaluating whether or not the calibration has reasonably (appropriately) performed, and details thereof will be described later.

The position detecting apparatus 100 determines whether or not the evaluation result of the evaluation processing indicates "reasonable (OK)" (Step S11). When the position detecting apparatus 100 determines that the evaluation result indicates "reasonable" (OK in Step S11), the series of calibration processing ends, and the aforementioned operation processing is performed.

Meanwhile, if the position detecting apparatus 100 determines that the evaluation result of the evaluation processing does not indicate reasonable (OK) (NG in Step S11), an output requiring cause analysis is provided (Step S15).

Specifically, the display data generation unit 85 generates data for displaying each sampling position 20 stored in the position storage unit 80 and the target position 21 associated with the sampling position 20 in the same coordinate space in Step S15 and outputs the generated display data to the display controller 114 (Step S7). In this manner, a screen for displaying each sampling position 20 and the target position 21 in an associated manner in the same coordinate space is output to the display unit 132.

In addition, the evaluation unit 70 retrieves the cause storage unit 90 and specifies cause data Ri including evaluation content RA corresponding to the evaluation result in Step S15. Then, the evaluation unit 70 outputs the specified cause data Ri to the display data generation unit 85. The display data generation unit 85 generates display data from the cause data Ri and outputs the generated display data to the display controller 114. In this manner, it is possible to display the cause data Ri (an estimated cause RB or a countermeasure) that is considered to have caused the unreasonable calibration on the display unit 132.

The user adjusts the respective parts (Step S17). Specifically, it is possible to provide information for supporting adjustment of calibration to the user from the content displayed on the display unit 132, that is, from a screen (hereinafter, also referred to as a position associating screen) in which each sampling position 20 and the target position 21 are associated in the same coordinate space or the cause data Ri (the estimated cause RB or the countermeasure RC) in Step S17. After the user performs the adjustment, the position detecting apparatus 100 can be caused to perform the calibration again.

(F-2. Operation Processing)

In the embodiment, actual operations for alignment by the position detecting apparatus 100 are performed after the aforementioned adjustment through the calibration is completed. Specifically, referring to FIG. 13, the position detecting apparatus 100 specifies a feature image that is a partial image corresponding to the feature portion from image data obtained by imaging the object (workpiece 4) arranged on the upper surface of the stage 2, detects the position of the specified feature image (Step T3), and outputs a control command for the moving mechanism on the basis of the detected position. In this manner, the stage 2 moves such that the workpiece 4 can be arranged (aligned) at an accurate position.

In addition, it is possible to perform the calibration using the position detecting apparatus 100 provided in an actual operation environment as illustrated in FIG. 13 according to the embodiment. That is, the position detecting apparatus 100 stores one or a plurality of image data items 10 imaged at each target position 21 in advance in the image storage unit 60 and stores position data 30 based on the detection from each image data item 10 in the position storage unit 80. During actual operations, the evaluation unit 70 performs evaluation on the calibration (determination of reasonability) by using content in the image storage unit 60 and the position storage unit 80. In this manner, it is possible to omit the number of processes related to the processing of storing the image data 10 in the image storage unit 60 and the processing of storing the position data 30 in the position storage unit 80, that is, the processing in Steps S1, S3, S13, and S14 in FIG. 14 even if the calibration is performed in the actual operations.

G. DISPLAY EXAMPLE OF POSITION ASSOCIATING SCREEN

FIGS. 15A-15D, 16, and 17 are diagrams illustrating examples of the position associating screen according to the embodiment. In the associating screen in FIGS. 15A, 16, and 17, each target position 21 and the sampling position 20 associated with the target position 21 in the position storage unit 80 are represented by different icons (icons of plus marks, for example) in the actual coordinate system that is an XY two-dimensional space.

In addition, in FIG. 15B, the feature image 22 associated with the target position 21 in the position storage unit 80 is displayed at each target position 21 in the similar actual coordinate system.

The position associating screen in FIG. 15C is different from that in FIG. 15A in that each target position 21 and the sampling position 20 associated with the target position 21 in the position storage unit 80 are represented by different icons (plus icons, for example) in a coordinate system in a monoaxial (an X axis, for example) direction in the actual coordinate system. In addition, on the position associating screen in FIG. 15D, the minimum difference and the maximum difference from among differences (errors) between the respective target positions 21 in a coordinate system in a monoaxial (an X axis, for example) direction in the actual coordinate system and the plurality of respective sampling positions 20 associated with the target positions 21 in the position storage unit 80 are represented in an associated manner by using a data table.

In the case of the calibration illustrated in FIGS. 15A to 17, the evaluation unit 70 calculates the differences between the plurality of sampling positions 20 and the associated target positions 21 in the position storage unit 80 and evaluates the calculated differences by using reference data 35, for example, in the evaluation processing. The reference data 35 includes a threshold value of the differences, for example. The evaluation unit 70 outputs "reasonable (OK)" as a result of the evaluation when the evaluation unit 70 determines that a condition (the calculated differences ≤the threshold for the differences) is satisfied for all the target positions 21 while the evaluation unit 70 outputs "not reasonable (OK)" as a result of the evaluation in a case in which the evaluation unit 70 determines that the condition (the calculated differences ≤the threshold for the differences) is not satisfied for all the target positions 21, for example.

(G-1. Example of Screen that Displays Precision of Variations in Repeated Samplings)

Figure 18:
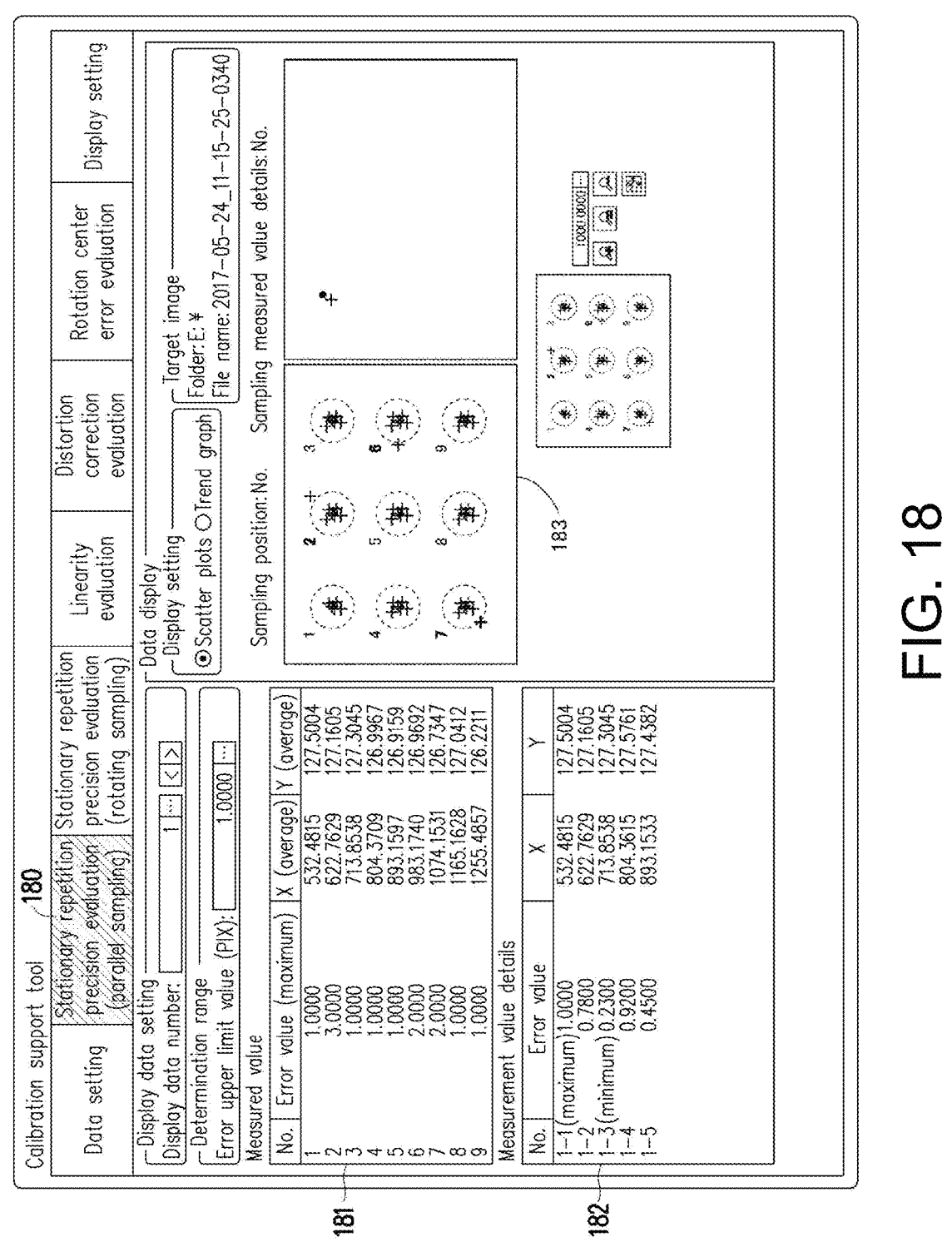
Figure 19:
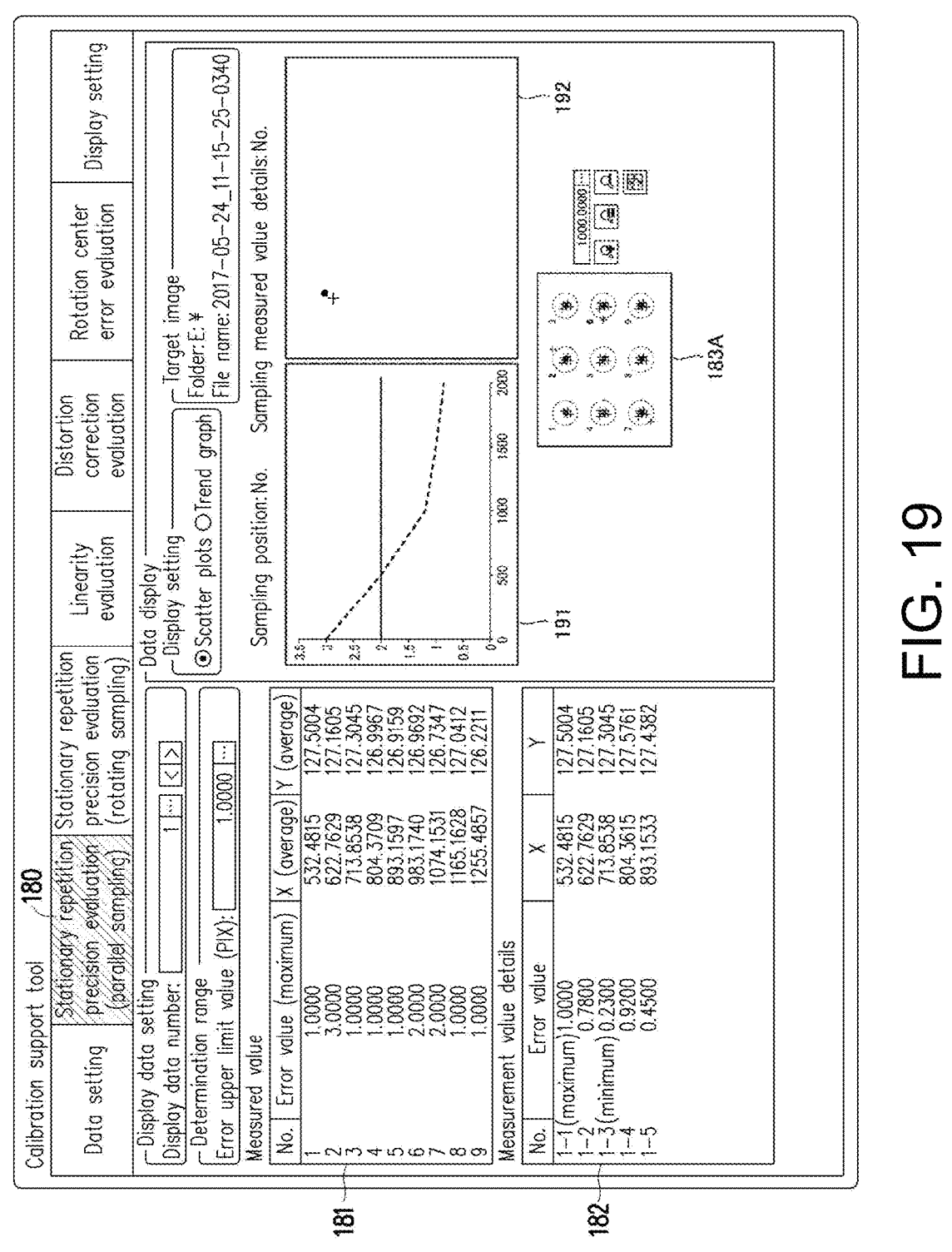

FIGS. 18 and 19 are diagrams illustrating an example of the position associating screen that displays variations in the sampling positions according to the embodiment. The user can cause the position associating screen in FIG. 18 that represents results of sampling performed a plurality of times at the respective target positions 21 to be displayed by operating a tab 180 on the screen.

The position associating screen in FIG. 18 is an example of the screen in a case in which the plurality of sampling positions 20 are detected for the respective target positions 21 by repeating the calibration. The screen in FIG. 18 includes sampling data tables 181 and 182 and a display region 183 of the sampling positions 20.

The sampling data tables 181 and 182 include sampling result checking information, sampling result comparison information, and display forms to improve visibility of the information, for example. Specifically, the sampling result checking information includes all data items (positions, difference values, and the like) related to the sampling positions 20 and statistical values (values such as a maximum value, a minimum value, an average value, a standard deviation indicating a degree of variation and the like) of the sampling positions 20, for example. The measurement result comparison information includes information for comparing the target positions 21 and the sampling positions 20 in the form of a table and information for comparing acquired data including the sampling positions 20 obtained by the calibration performed in the past and acquired data including the sampling positions 20 obtained by the calibration performed this time in the form of a table, for example.

For the improvement in the visibility of the information, the measurement results (values indicating variations in the sampling positions 20, the sampling positions 20, and the like) that are equal to or greater than a specific value are displayed in a form (emphasized display, for example) that is different from that for the other values in the tables, for example, and the statistical values of the sampling positions 20 are displayed in a form (emphasized display, for example) that is different from that for the other values, for example, in the sampling data tables 181 and 182.

In addition, the display region 183 of the sampling positions 20 includes information for checking the sampling positions 20 in association with the target positions 21, comparison information, and display form for improving the visibility. For example, the plurality of associated sampling positions 20 are displayed in the form of scatter plots for each target position 21 in the two-dimensional coordinate space.

On the basis of such comparison information, marks of the target positions 21 and the sampling positions 20 are presented by being displayed in an overlapping manner or an aligned manner at the target positions 21. In addition, comparison display between the calibration data obtained in the past and the calibration data obtained this time is presented (displayed in an overlapping manner or in an aligned manner).

In addition, as the display form to improve the visibility, the sampling positions 20 or the values of the variations thereof that are equal to or greater than a specific value are displayed in a form (emphasized display) that is different from that for the other value, and the statistical values of the sampling positions 20 are displayed in a form (emphasized display) that is different from that for the other values in a manner similar to that in the sampling data tales 181 and 182. Circular marks around the target positions 21 are displayed in the display region 183. The diameter of the marks corresponds to the aforementioned specific threshold value. Therefore, sampling positions that have variations with differences of less than the specific threshold value from the target positions 21 are marked inside the circles while the sampling positions 20 that vary with the differences of equal to or greater than the specific threshold value are marked outside the circles. Therefore, it is possible to visually provide the degrees of variations of the sampling positions 20 relative to the respective target positions 21 to the user.

FIG. 19 illustrates a modification example of the position associating screen in FIG. 18. The screen in FIG. 19 includes a display region 192 of the feature image 22, a display region 191 of the sampling results, and an enlarged display region 183A in which the sampling positions 20 are displayed in an enlarged manner.

The display region 192 of the image displays the image data 10 or the feature image 22 that is actually imaged, for example. In this manner, the information for checking the sampling results is provided.

The display region 192 of the image displays information for comparing the sampling results, for example. For example, the display region 192 provides information for comparing a plurality of image data items by displaying, in a comparative manner (displayed in the overlapping manner or in the aligned manner), ideal image data (reference image data), the image data acquired by the calibration performed in the past, and new image data. For example, the detected images (the image data 10 or the feature image 22) and the ideal image are displayed in the comparative manner (displayed in the overlapping manner or in the aligned manner).

The display region 192 displays an image (the image data 10 or the feature image 22) associated with a sampling position 20 with the maximum difference from the target position 21 and an image (the image data 10 or the feature image 22) associated with a sampling position 20 with the minimum difference in the comparative form (displayed in the overlapping manner or in the aligned manner).

In addition, the display region 192 displays the feature image 22 in association with the reference image of the target positions 21 in a graphically comparative manner (displays them in the overlapping manner or in the aligned manner). The reference image of the target positions 21 is included in the reference data 35.

The enlarged display region 183A of the sampling positions 20 displays information that is similar to that displayed in the display region 183A in FIG. 18.

The display region 191 displays changes in the sampling positions 20 by a graph in a coordinate space. For example, differences of the respective sampling positions 20 associated with the target positions 21 from the target positions 21 are displayed in a form of a chronological order that follows relative time elapse from the start of the plurality of samplings. For example, the differences from the sampling positions 20 or the target positions 21 or the like are displayed in a chronological order in accordance with the sampling order. Alternatively, the horizontal axis of the coordinates is assigned to a sampling time or a relative time from the first measurement, and a situation (a time required for convergence or the like) in which a difference of a sampling position 20 associated with a certain target position 21 from the target position 21 (see the broken line in the drawing) converges to be less than a specific threshold value (see the solid line in the drawing) indicated by the reference data 35 is visually presented in the display region 191 as illustrated in FIG. 19.

(G-2. Example of Screen that Displays Effects of Distortion Correction)

Figure 20:
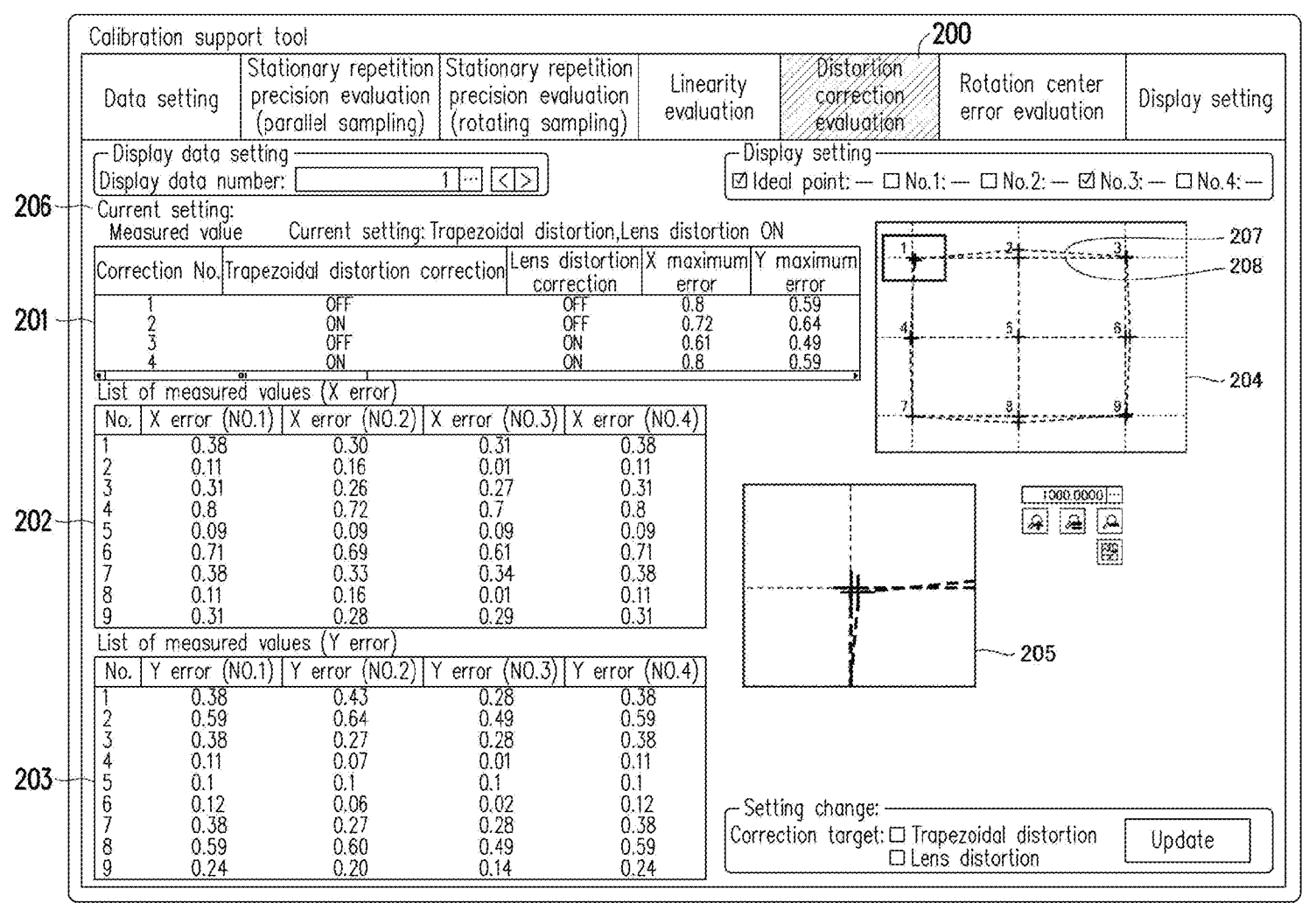

FIG. 20 is a diagram illustrating an example of the position associating screen that displays effects of the distortion correction according to the embodiment. The user can cause the screen in FIG. 20 to be displayed by operating a tab 200 on the screen.

The screen in FIG. 20 includes sampling data tables 201, 202, and 203, display regions 204 and 205 of the sampling positions 20, and a current setting pattern 206 set by a parameter table 121 or the like. In the embodiment, it is possible to set patterns "No. 1" to "No. 4" in the sampling data table 201, for example, and data of the setting pattern No. 3, for example, among them is displayed in FIG. 20. Note that the number of setting patterns is not limited to these four patterns. In addition, the setting patterns of the data displayed on the screen in FIG. 20 can be switched.

The sampling data table 201 includes the maximum value and the minimum value of differences in the X axis direction so as to correspond to the respective setting patterns for correction processing based on the parameter table 121 or the like. The sampling data table 202 includes differences in the X axis direction in association with the respective target positions 21 in calibration in the setting patterns so as to correspond to the respective setting patterns in the sampling data table 202. The sampling data table 203 includes differences in the Y axis direction in association with the respective target positions 21 in the calibration in the setting patterns so as to correspond to the respective setting patterns of the sampling data table 202. Note that the sampling data tables 201 to 203 can include all the data items about the sampling positions 20 (for example, the differences from the target positions 21, the target positions 21, the sampling positions 20, and the like) and statistical values of all the data items, for example, in association with the respective setting patterns.

The sampling data tables 201. 202, and 203 can display information related to comparison between setting patterns for correction and data (for example, the target positions 21 and the sampling positions 20) after the correction processing and comparison between the sampling positions 20 in the past and the latest sampling positions 20. Differences that are equal to or greater than a specific value obtained by setting a threshold value or the maximum value of the differences, the minimum value of the differences, and the like are displayed in a form (for example, emphasized display) that is different from that for the other data.

The display region 204 displays the position associating screen. For example, the display region 204 displays the respective target positions 21 and the sampling positions 20 associated with the target positions 21 in a two-dimensional coordinate space. Further, the display region 204 can display the sampling positions 20 before and after the correction using setting parameters as the sampling positions 20. In addition, the display region 204 displays auxiliary lines for making it easier to check the respective sampling positions 20, for example.

In the embodiment, the auxiliary lines can include line segments 207 and 208 that indicate relative positional relationships between the target positions 21 and the sampling positions 20, for example. For example, the auxiliary lines can include a line segment 207 connecting the sampling positions 20 associated with the respective target positions 21 in an order of the movement to the respective target positions 21 by the moving mechanism. Alternatively, the auxiliary lines can include a line segment 208 connecting the respective target positions 21 in an order of the movement by the moving mechanism, for example.

In addition, the sampling positions 20 with differences that are equal to or greater than a specific threshold value can be displayed in a form (emphasized display) that is different from that for the other data in the display region 204.

In addition, the display region 204 displays the position associating screen for each setting pattern, for example. Specifically, image processing performed by the image processing unit 50 includes parameters (correction parameters) for a correction function (affine transformation, distortion correction, or the like) for correcting the image data 10 from the amount of movement by the moving mechanism in order to detect the position of the feature portion (mark 14) from the image data 10 in the embodiment. The image processing unit 50 can detect the respective sampling positions 20 obtained by the image processing before and after the application of the correction function (and/or the correction parameters) as the sampling positions 20 associated with the target positions 21. In the display region 204, the sampling positions 20 associated with the target positions 21 can include the respective sampling positions 20 obtained by the image processing before and after the application of the correction function (and/or the correction parameters).

In addition, the image processing unit 50 can detect the sampling positions 20 by applying setting patterns with different correction parameters in the embodiment. The image processing unit 50 can specify a setting pattern to calculate a sampling position 20 capable of minimizing a difference (or a statistical value) from the target position 21 from among the respective setting patterns and display the position associating screen for the sampling positions 20 and the target positions 21 detected by the specific setting pattern in a display form (for example, emphasized display) that is different from that for the position associating screen based on the other setting patterns.

The display region 205 displays a pair selected by the user in an enlarged manner from among pairs of the target positions 21 and the sampling positions 20 associated on the position associating screen in the display region 204. The user can check, in detail, degrees of differences (for example, degrees of differences due to differences in setting patterns) in the detection of the target positions 21 and the sampling positions 20 at the target positions 21 from such enlarged display.

(G-3. Example of Screen that Displays Precision of Linearity of Sampling)

Figure 21:
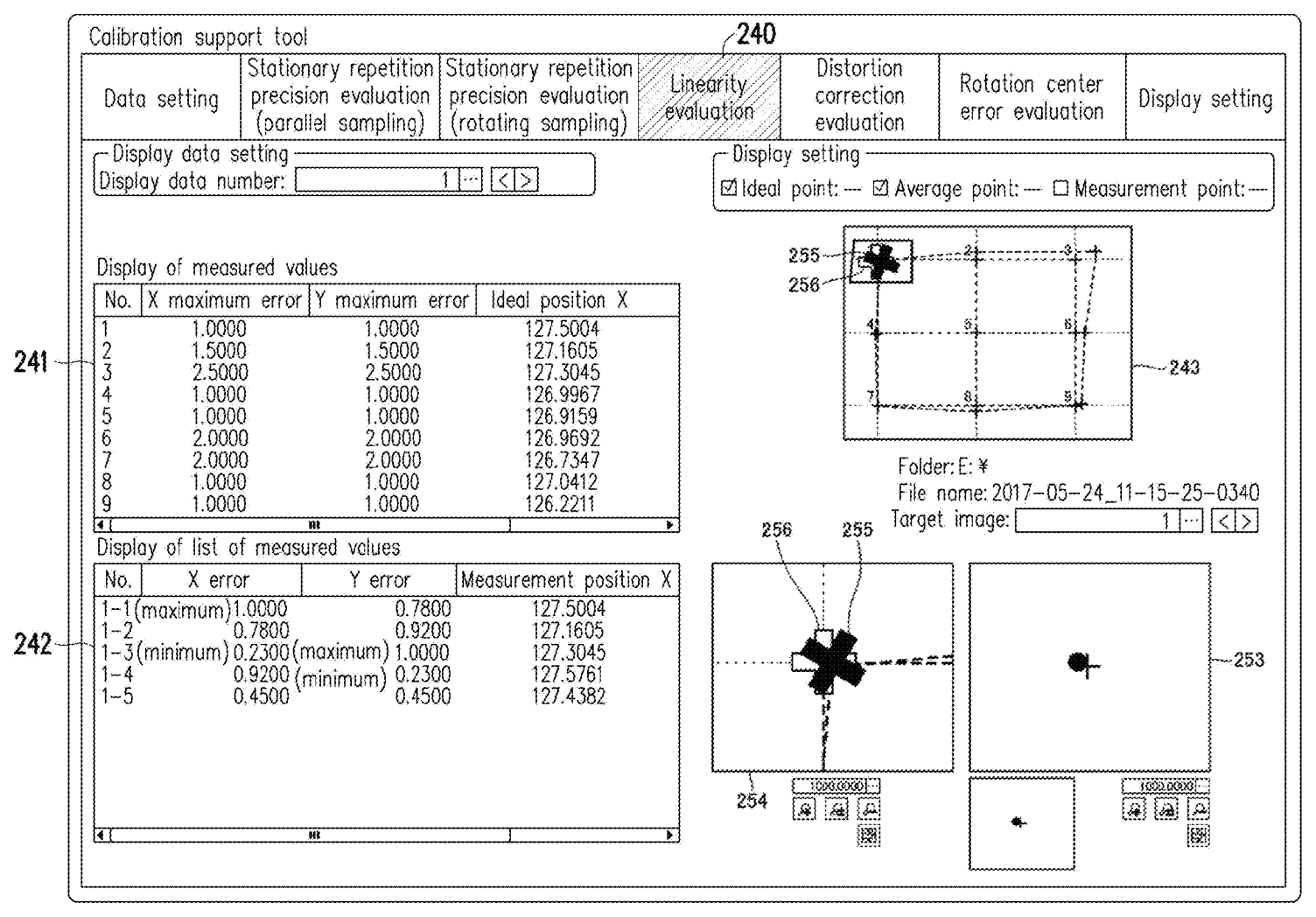

FIG. 21 is a diagram illustrating an example of the position associating screen obtained by sampling based on linear movement according to the embodiment. The user can display the screen in FIG. 21 by operating a tab 240 on the screen. The screen in FIG. 21 includes sampling data tables 241 and 242, a display region 243 of the sampling positions 20, an image display region 253, and an enlarged display region 254.

The sampling data tables 241 and 242 include all data items (for example, differences in the amounts of movement of the stage 2 (differences from the target positions 21), the target positions 21, the sampling positions 20, target angles, detection angles, and the like) of the sampling positions 20. The detection angles are inclination angles of the feature image 22 obtained by the image processing unit 50 and indicate inclination angles from a predefined posture of the mark 14 (feature portion).

In addition, the sampling data tables 241 and 242 can include statistical values and the like of all the data items about the sampling positions 20.

The sampling data tables 241 and 242 can include data display in the comparative form of data about the target positions 21 and the sampling positions 20 or data display in the comparative form between all the data items about the sampling positions 20 obtained by the calibration performed in the past and all the data items about the sampling positions 20 obtained by the calibration performed this time, for example.

In addition, the sampling data tables 241 and 242 display differences that are equal to or greater than a specific threshold value or the sampling positions 20 with the differences in a form (emphasized display) that is different from that for the other data, display the maximum value or the minimum value of the differences in a form (emphasized display) that is different from that for the other data, or display distances between two points, namely the target position 21 and the sampling position 20 with a difference that is equal to or greater than a specific threshold value in a form (emphasized display) that is different from the other data.

The display region 243 displays a mark 256 at each target position 21 with a predefined posture at each target position 21 in a two-dimensional coordinate space and displays the mark 255 at a sampling position 20 associated with the target position 21 with an inclination angle from the aforementioned predefined posture. The inclination angle corresponds to an inclination angle of the feature image 22 specified from the image data 10 from the predefined posture.

In addition, the target positions 21 and the sampling positions 20 are displayed by using marks in the overlapping manner or in the aligned manner, for example, in the comparative form in the display region 243. Also, data of the sampling positions 20 obtained by the calibration performed in the past and data of the sampling positions 20 obtained by the calibration performed this time are displayed by using marks in the overlapping manner or in the aligned manner, for example, in the comparative form in the display region 243.

In addition, the display region 243 displays a mark 14 of a sampling position 20 that has not been sampled at the position, the angle, or the like at the target position 21 in a display form (for example, emphasized display) that is different from that for the other marks. In addition, the distance between two points, namely a target position 21 and a sampling position 20 with a difference that is equal to or greater than a specific threshold value is displayed in a display form (for example, emphasized display) that is different from that for the other distances. In addition, auxiliary lines (for example, the broken lines in the display region 243) for making it easier to check the respective sampling positions 20 can be displayed in the display region 243.

The image display region 253 displays a sampling image (the feature image 22 or the image data 10 that is actually imaged) or a target image (a reference feature image or image data). In this case, the sampling image and the target image can be displayed in the comparative form (displayed in the overlapping manner or in the aligned manner). In addition, the sampling image obtained by the calibration performed in the past and the sampling image obtained by the calibration performed this time can be displayed in the comparative manner (displayed in the overlapping manner or in the aligned manner) in the image display region 253. In addition, an image and graphics (display and enlarged display of the sampling positions 20) can be displayed on the comparative form (displayed in the overlapping manner or in the aligned manner).

The enlarged display region 254 displays the target positions 21 and the sampling positions 20 associated with the target positions 21 as marks in an enlarged manner. In that case, both the marks can be displayed in the comparative manner (displayed in the overlapping manner or in the aligned manner). Targets of the enlarged display can include the sampling positions 20 obtained by the calibration performed in the past and the sampling positions 20 obtained by the calibration performed this time. In addition, marks that have not been sampled at the target positions 21 or at the target angle or the like are displayed in a display form (for example, emphasized display) that is different from that for the other distances in the enlarged display.

(G-4. Example of Screen that Displays Precision of Sampling During Rotation Movement)

Figure 22:
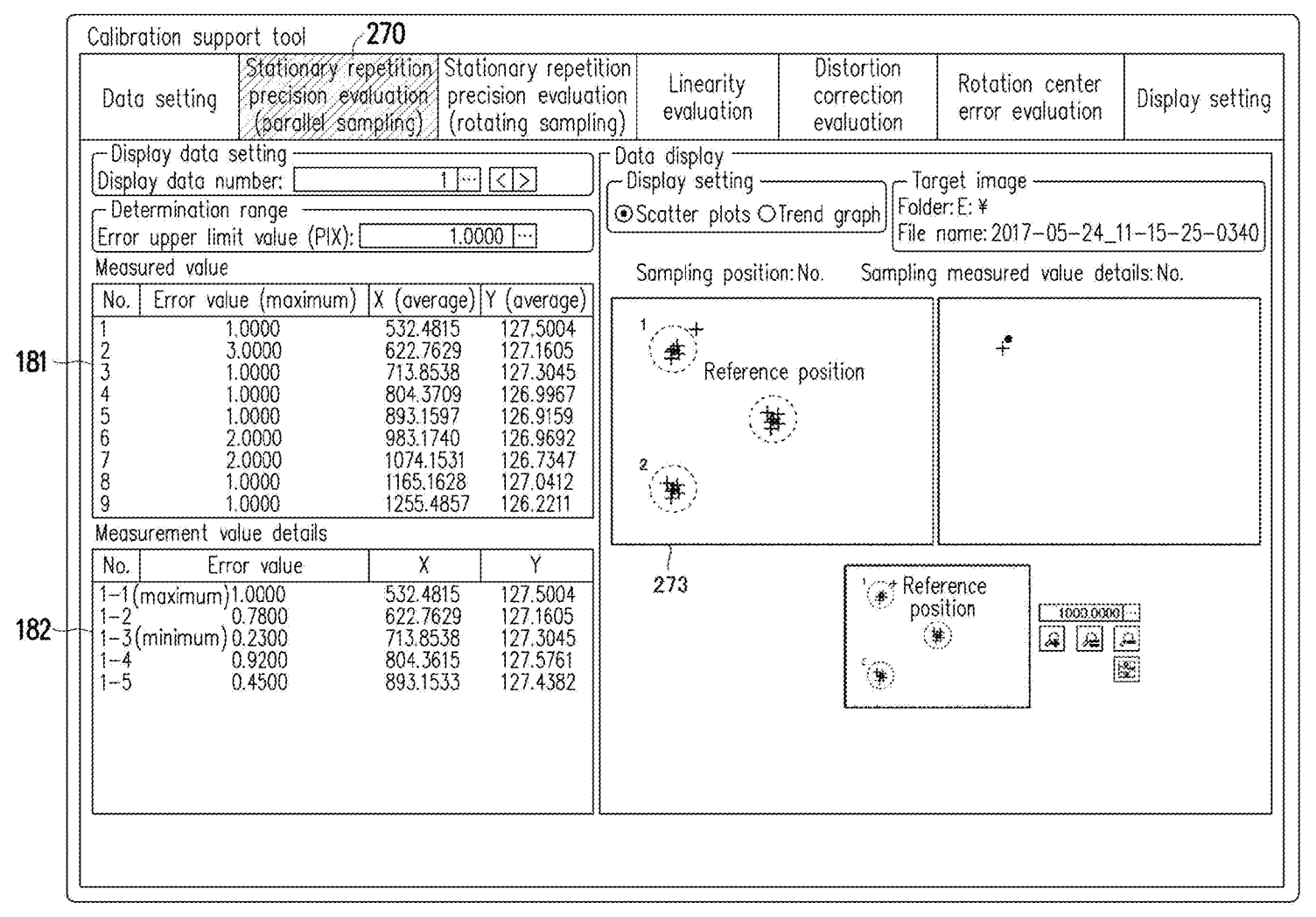

FIG. 22 is a diagram illustrating an example of the position associating screen obtained by sampling based on rotation movement according to the embodiment. The user can cause the screen in FIG. 22 to be displayed by operating a tab 270 on the screen. The screen in FIG. 22 includes the sampling data tables 181 and 182 that are similar to those in FIG. 18 and a display region 273 of the sampling positions 20. In the display region 273, display of the sampling positions 20 (display of the sampling positions 20 associated with the target positions 21) can be switched to graphic display of rotation sampling in a case in which the moving mechanism is driven to rotate.

Figure 23:
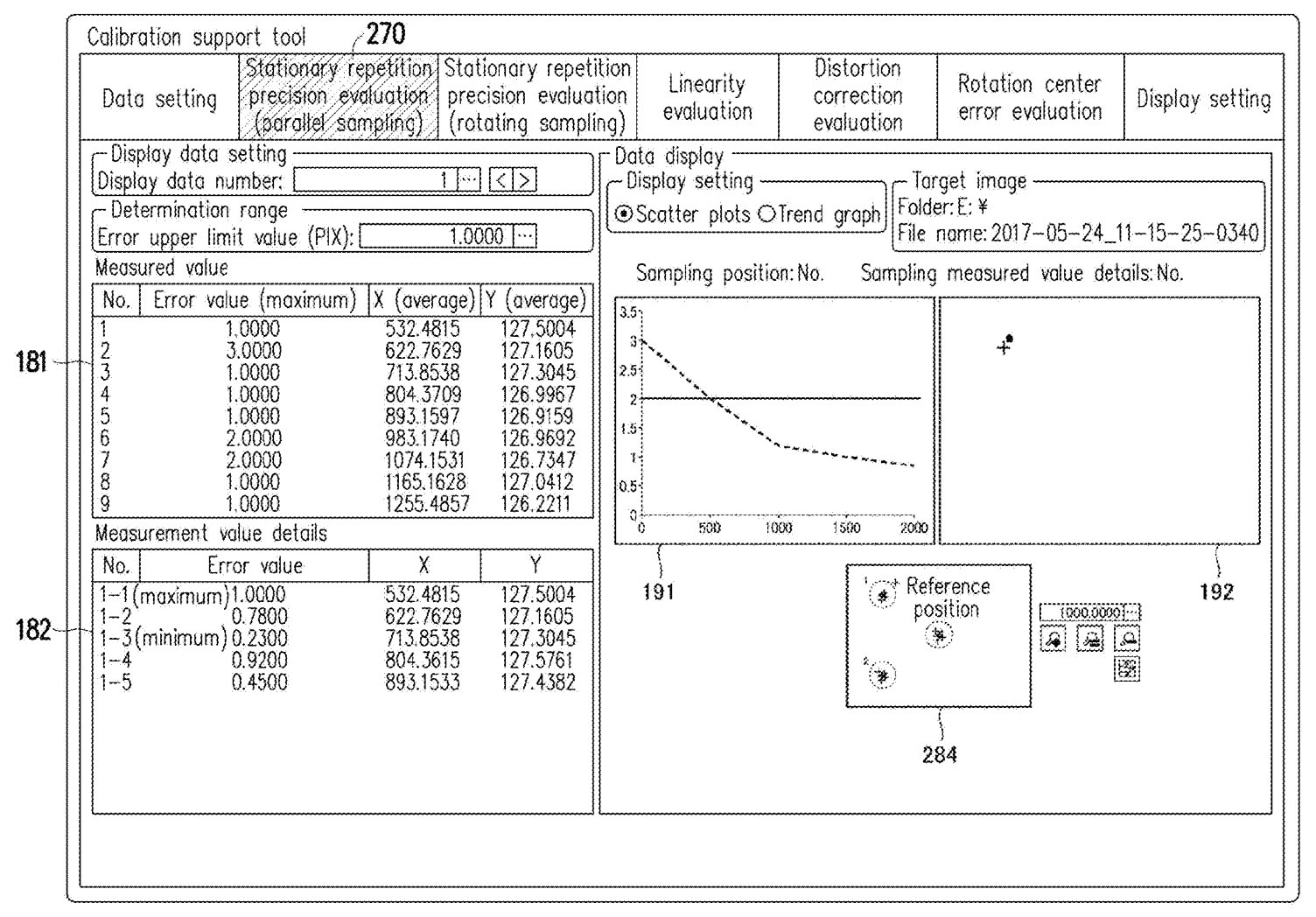

FIG. 23 is a diagram illustrating another example of the position associating screen obtained by sampling based on rotation movement according to the embodiment. The display screen in FIG. 23 is a modification example of the screen in FIG. 22.

The screen in FIG. 23 includes the sampling data tables 181 and 182, the display region 192 of the feature image 22 that is similar to that in FIG. 19, a sampling result display region 191, and an enlarged display region 284 of the sampling positions 20. The enlarged display region 284 displays information that is similar to that in the display region 273 in FIG. 22.

(G-5. Example of Screen that Displays Effects of Correction During Rotation Movement)

Figure 24:
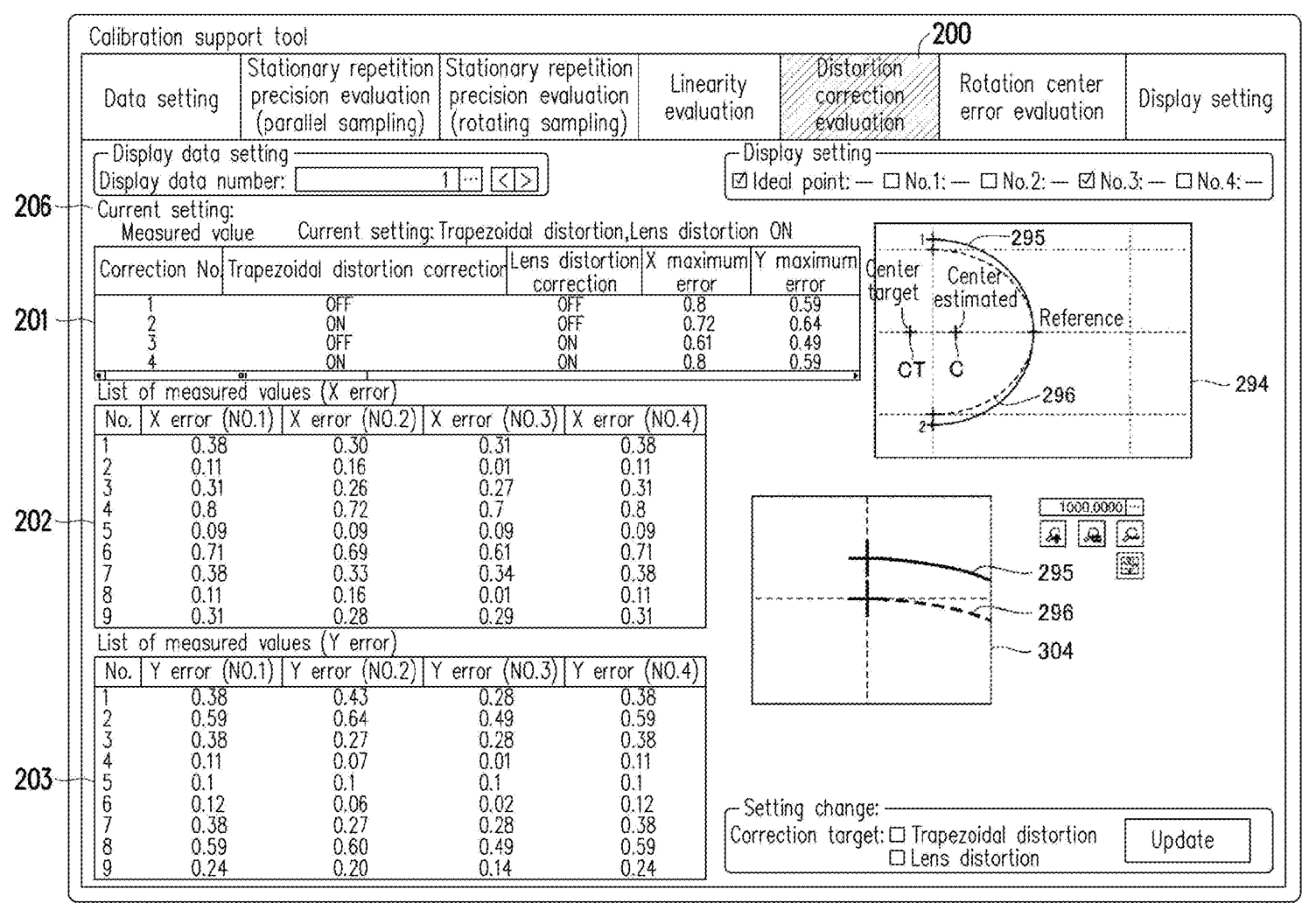

FIG. 24 is a diagram illustrating another example of the position associating screen obtained by the sampling based on rotation movement according to the embodiment. The user can cause the screen in FIG. 24 to be displayed by operating a tab 200 on the screen. The screen in FIG. 24 includes the sampling data tables 201, 202, and 203 and the current setting pattern 206 set by the parameter table 121 or the like that are similar to those in FIG. 20. Further, the screen in FIG. 24 includes a display region 294 of the sampling positions 20 and an enlarged display region 304 of the sampling positions 20. FIG. 24 illustrates a case in which the rotation center C of the stage 2 has not accurately been estimated by the current setting pattern 206.

The display region 294 displays the rotation center C estimated from the sampling positions 20 in a case in which the stage 2 rotates and a target rotation center CT set by the parameter table 121 in a distinguishable form (for example, displays them with a changed display color or with a changed line type) and displays a difference therebetween. The display region 294 includes data for displaying the respective target positions 21 on a circumferential line 296 around the target center position (target rotation center CT) or data for displaying the sampling positions 20 associated with the respective target positions 21 on a circumferential line 295 around an estimated center position (that is, the estimated rotation center C). The display region 294 displays the estimated rotation center C and the target rotation center CT in the distinguishable form (for example, with a changed display color or with a changed line type). In addition, the display region 294 displays the circumferential line 295 connecting the sampling positions 20 sampled during the rotation movement around the estimated rotation center C as a center and the circumferential line 296 connecting the target positions 21 around the target rotation center C as a center in the distinguishable form (for example, with a changed display color or with a changed line type).

In addition, the enlarged display region 304 displays the sampling positions 20 obtained by the rotation movement in the enlarged manner. For example, the marks indicating the target positions 21 and the marks indicating the sampling positions 20 associated with the target positions 21 are displayed in the distinguishable form (for example, displayed with a changed display color or with a changed line type).

(G-6. Another Example of Screen that Displays Effects of Correction During Rotation Movement)

Figure 25:
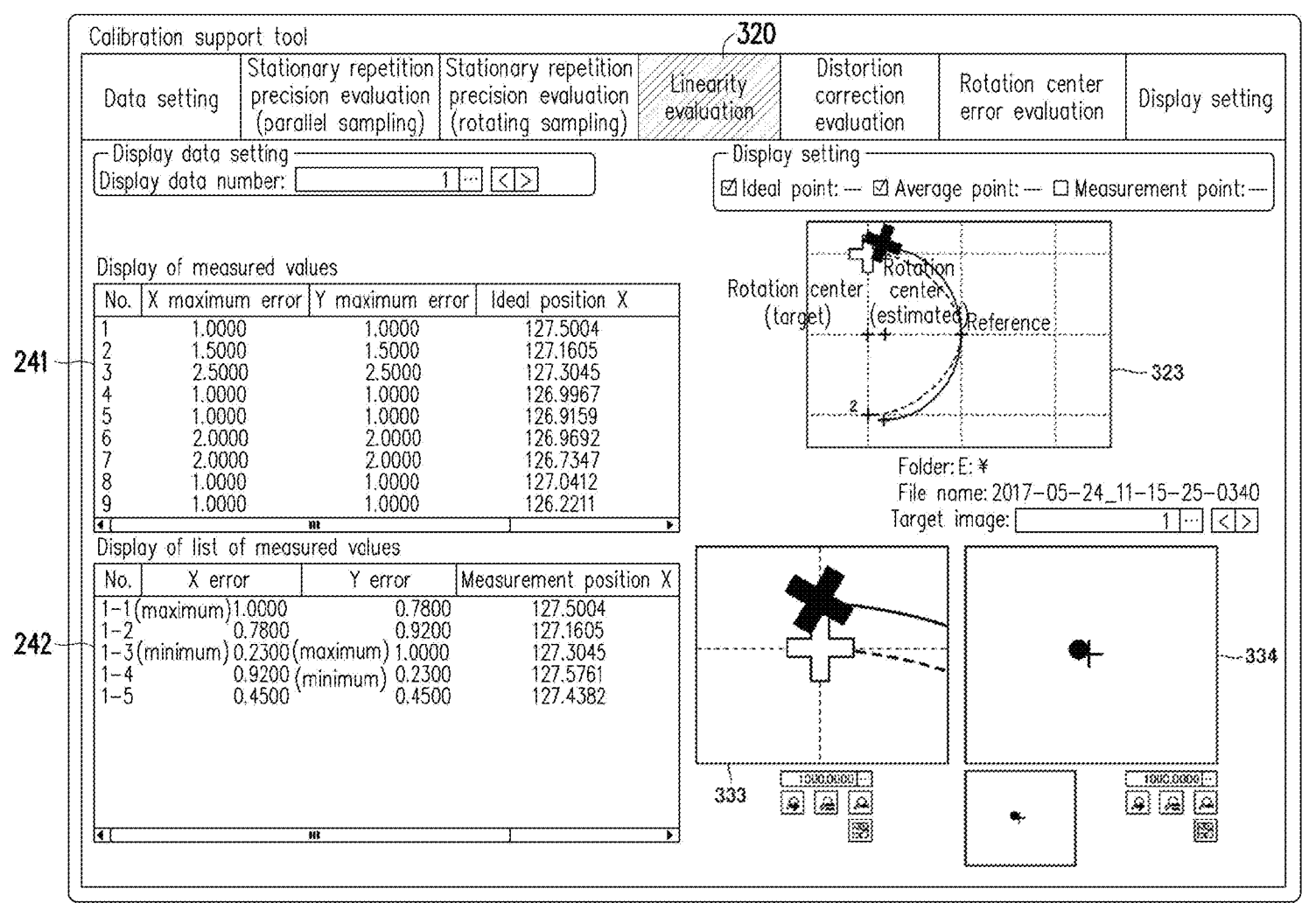

FIG. 25 is a diagram illustrating another example of the position associating screen obtained by sampling based on rotation movement according to the embodiment. The user can cause the screen in FIG. 25 to be displayed by operating a tab 320 on the screen. The screen in FIG. 25 includes the sampling data tables 241 and 242 that are similar to those in FIG. 21, a display region 323 of the sampling positions 20, an enlarged display region 333 of the sampling positions 20, and a feature display region 334. In FIG. 25, the sampling data tables 241 and 242 can further include all data items (including the sampling positions 20, the target positions 21, and the position of the estimated rotation center C, for example) of the sampling positions 20.

In FIG. 25, the sampling data tables 241 and 242 can further include all data about the sampling positions 20 (for example, the sampling positions 20, the target positions 21, and the estimated position of the rotation center C).

The display region 323 displays the positions of the estimated rotation center C and the target center CT with marks, for example, and displays a target sampling circumferential line. Information that is similar to that in the enlarged display region 254 and the image display region 253 in FIG. 21 can be displayed in the enlarged display region 333 and the feature display region 334, respectively.

The user can provide support information to determine that only a part of the image data 10 has been able to be calibrated, that the rotation center C of the stage 2 has not appropriately been estimated, that the detected posture (inclination angle) of the feature portion indicated by the results of sampling is not appropriate (the rotation center C of the stage 2 has not appropriately been estimated), that sampling intervals are not equal intervals, and that sampling has not been done at the target positions 21 from the screen in FIG. 23.

H. EVALUATION OF CALIBRATION

Evaluation processing performed by the evaluation unit 70 in Step S9 in FIG. 14 will be described. In the embodiment, the evaluation unit 70 evaluates the sampling positions 20 by mainly comparing differences between the target positions 21 and the sampling positions 20 associated with the target positions 21 with the threshold value indicated by the reference data 35 by using predefined evaluation conditions. In addition, the evaluation unit 70 retrieves the cause storage unit 90 on the basis of the evaluation obtained by the evaluation processing and reads the cause data Ri associated with evaluation content RA that represent the evaluation from the cause storage unit 90 through the retrieval.

FIGS. 26 to 31 are diagrams illustrating examples of the cause data Ri according to the embodiment. The evaluation processing and the cause data Ri will be described with reference to FIGS. 26 to 31.

(H-1. Evaluation of Sampling Positions 20 Using Feature Image 22)

The evaluation unit 70 calculates differences (also referred to as detection differences) between the respective target positions 21 and the sampling positions 20 associated with the target positions 21 and matches the feature image 22 associated with the sampling positions 20 with a reference image of the mark 14. Note that the reference data 35 has the reference image of the mark 14. The evaluation unit 70 evaluates that "there are points at which the target positions and the sampling position 20 do not coincide" when the evaluation unit 70 detects sampling positions 20 that satisfy predefined conditions ((a detection difference a specific threshold value of reference data 35) and (inconsistent with feature image 22)) from among the sampling positions 20 associated with the respective target positions 21. The evaluation unit 70 reads cause data R1 (FIG. 26) associated with the aforementioned evaluation (evaluation content RA) from the cause storage unit 90.

The user can check that the calibration is "not reasonable" and acquire information about the estimated cause RB (for example, erroneous detection of a background portion other than a target mark at an inconsistent point) and the countermeasure to address the cause (to adjust search setting (a model image, a setting parameter, or the like) by the cause data R1 being displayed.

In this case, the screens in FIG. 15A and FIG. 15B can also be displayed, for example. The user can check that the sampling has failed at a target position 21 at the upper right end in the field of view of the camera from the position associating screen in FIG. 15A. In addition, the user can determine that the background image instead of the feature image 22 has been specified by the image processing at the target position 21 from the screen in FIG. 15B.

In addition, the position associating screen illustrated in FIG. 18 or 19 may be displayed as the position associating screen.

(H-2. Evaluation of Trend of Differences in Sampling Positions 20)

The evaluation unit 70 calculates the detection differences between the respective target positions 21 and the sampling positions 20 associated with the target positions 21 and evaluates that "the amount of deviation of a sampling position increases by a specific amount in the X direction", for example, when the evaluation unit 70 detects that a detection difference of the sampling position 20, which satisfies a predefined condition (detection difference a specific threshold value of reference data 35), has a trend to appear in the X direction or the Y direction. The evaluation unit 70 reads cause data R2 (FIG. 26) associated with the evaluation (evaluation content RA) from the cause storage unit 90.

The user can check that the calibration is "not reasonable" and acquire information of the estimated cause RB (for example, a driving condition of the moving mechanism (the amount of movement of the stage is inappropriate, for example)) and the countermeasure RC (to check the control of the stage, for example) to address the cause by the cause data R2 being displayed.

Figure 16:
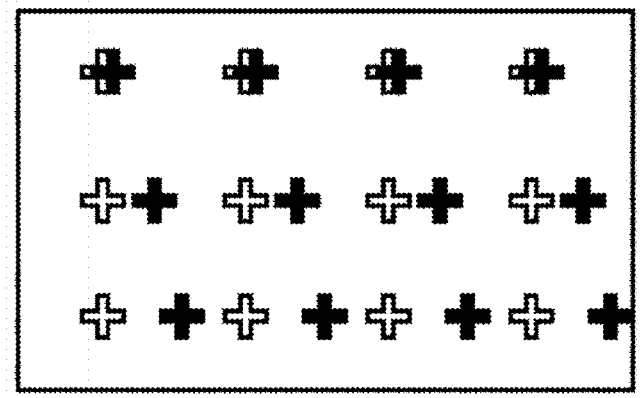
FIG. 16 is a diagram illustrating an example of the position associating screen according to the embodiment.

In this case, the position associating screen in FIG. 16, for example, can be displayed. The user can check that there is a trend that differences occur in the X direction from the target positions 21 in the field of view of the camera from the screen in FIG. 16. In addition, the position associating screen illustrated in FIG. 18 or 19 may be displayed as the position associating screen.

(H-3. Evaluation of Difference from Target Position 21 at Image End Portion)

The evaluation unit 70 calculates detection differences between the respective target positions 21 and the sampling positions 20 associated with the target positions 21 and evaluates that "there is a point at which the target position and the sampling position do not coincide at an image end" when the evaluation unit 70 determines that a sampling position 20 that satisfies a predefined condition (the detection difference the specific threshold value of the reference data 35) is detected at the end portion of the image. The evaluation unit 70 reads cause data R3 (FIG. 26) associated with the evaluation (evaluation content RA) from the cause storage unit 90.

The user can check that the calibration is "not reasonable" and acquire information of the estimated cause RB (for example, an imaging condition (for example, an influence of camera lens distortion)) and the countermeasure RC (for example, to change the lens to a lens with no strain in the field of view) to address the cause by the cause data R3 being displayed.

Figure 17:
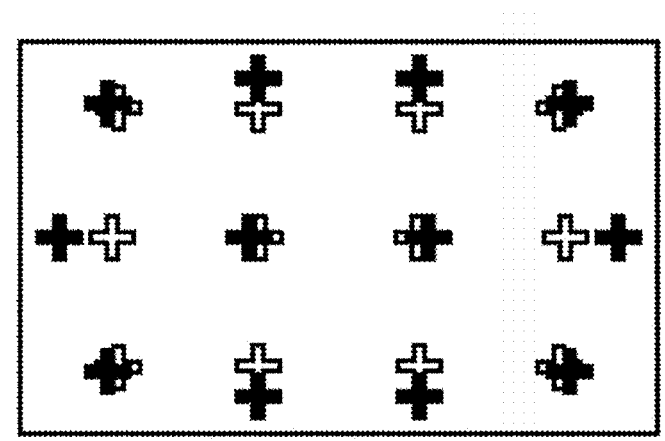
FIG. 17 is a diagram illustrating an example of the position associating screen according to the embodiment.
Figure 28:
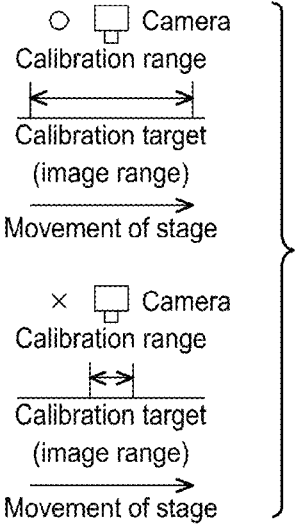
FIG. 28 is a diagram illustrating an example of the cause data Ri according to the embodiment.

In this case, the screen in FIG. 17, for example, can also be displayed. The user can check that the sampling has failed at the target position 21 at the end portion of the field of view (image) of the camera from the position associating screen in FIG. 17. In addition, the position associating screen illustrated in FIG. 29 may be displayed as the position associating screen.

(H-4. Evaluation of Variations in Differences from Target Positions 21)

The evaluation unit 70 calculates the detection differences between the respective target positions 21 and the sampling positions 20 associated with the target positions 21 and evaluates that variations in sampling are large when the evaluation unit 70 determines that a predefined condition (a value of variation in the detection difference a specific threshold value of the reference data 35) is satisfied. The evaluation unit 70 reads cause data R4 (FIG. 27) associated with the evaluation (evaluation content RA) from the cause storage unit 90. Note that the variation values are values that indicate magnitudes of variations, and the evaluation unit 70 can calculate the variation values from a standard deviation of the detection differences, for example.

The user can check that the calibration is "not reasonable" and acquire information of the estimated cause RB indicated by the cause data R4 and the countermeasure RC to address the cause by the cause data R4 being displayed.

In this case, the screens in FIGS. 18 and 19, for example, can also be displayed. The user can check the variation values from the position associating screens in FIGS. 18 and 19.

(H-5. Evaluation of Differences from Target Positions 21 Before and after Correction Processing)

In the embodiment, it is possible to perform calibration while changing the setting pattern of a function parameter for mapping the camera coordinate system to the actual coordinate system. Therefore, the evaluation unit 70 can compare the detection differences between the target positions 21 and the sampling positions 20 in a case in which the calibration is performed after the setting pattern is changed to a new setting pattern and the detection differences of the target positions 21 in a case in which the calibration is performed by the setting pattern before the change.

Specifically, the evaluation unit 70 evaluates that "the error of the sampling is still large even with the setting for the correction processing" when the evaluation unit 70 determines that a predefined condition (a detection difference after the change of the setting pattern a detection difference before the change) is satisfied. The evaluation unit 70 reads cause data R5 (FIG. 27) associated with the evaluation (evaluation content RA) from the cause storage unit 90.

The user can check that the calibration is "not reasonable" and acquire information of the estimated cause RB (for example, the setting of the image processing is inappropriate) indicated by the cause data R5 and the countermeasure RC (setting of the image correction processing is checked and adjusted) to address the cause by the cause data R5 being displayed.

In this case, the position associating screen in FIG. 20, for example, can also be displayed. The user can check a change of differences between the target positions 21 and the sampling positions 20 before and after the change of the setting pattern from the position associating screen in FIG. 20.

(H-6. Evaluation of Differences from Target Positions 21 with Angles)

The evaluation unit 70 detects an inclination of the feature image 22 associated with the sampling positions 20 by matching the feature image 22 with the reference image that the reference data 35 has and evaluates that "the posture (angle) of the sampling is not constant" when the evaluation unit 70 determines that the detected inclination satisfies a predefined condition (the magnitude of the inclination ≥a specific threshold value of the reference data 35). The evaluation unit 70 reads cause data R6 (FIG. 28) associated with the evaluation (evaluation content RA) from the cause storage unit 90.

The user can check that the calibration is "not reasonable" and acquire information of the estimated cause RB (for example, parameters for image processing (for example, setting for detecting the rotating object is inappropriate (setting for detecting a rotating object is employed for an object that does not rotate)) indicated by the cause data R6 and the countermeasure RC (to adjust search setting related to detection of the rotating target) by the cause data R6 being displayed. In this case, the screen in FIG. 21 can be displayed as the position associating screen. The user can specifically check the degree of the magnitude of the inclination from the position associating screen in FIG. 21.

(H-7. Evaluation of Calibration Range from Differences from Target Positions 21)

The evaluation unit 70 evaluates whether or not the sampling has been performed at the respective target positions 21 on the basis of whether or not the sampling positions 20 have been stored in association with the respective target positions 21 in the position storage unit 80. When the evaluation unit 70 determines that the sampling positions 20 have not been stored, the evaluation unit 70 evaluates that "the calibration has been able to be done only for a part of the image". The evaluation unit 70 reads cause data R7 (FIG. 28) associated with the evaluation (evaluation content RA) from the cause storage unit 90.

The user can check that the calibration is "not reasonable" and acquire information of estimated cause RB (for example, a parameter (for example, setting of a calibration (sampling) range is inappropriate and is excessively narrow) of the image processing) indicated by the cause data R7 and the countermeasure RC (for example, the setting of the calibration range is reviewed, and the setting is adjusted) to address the cause along with specific information RC1 about the countermeasure by the cause data R7 being displayed.

(H-8. Evaluation of Variations of Differences from Target Positions 21 During Rotation Movement)

The evaluation unit 70 calculates detection differences between the respective target positions 21 and the sampling positions 20 associated with the target positions 21 during the rotation movement and evaluates that "variations in sampling are large (stopping of the rotation of the stage has not accurately been estimated)" when the evaluation unit 70 determines that a predefined condition (variation values of the detection differences ≥a specific threshold value of the reference data 35) is satisfied. The evaluation unit 70 reads cause data R8 (FIG. 29) associated with the evaluation (evaluation content RA) from the cause storage unit 90.

The user can check that the calibration is "not reasonable" and acquire information of the estimated cause RB indicated by the cause data R8 and the countermeasure RC to address the cause by the cause data R8 being displayed.

In this case, the position associating screens in FIGS. 22 and 23, for example, can also be displayed. The user can check the degrees of variations from the position associating screens in FIGS. 22 and 23.

(H-9. Evaluation of Differences from Target Positions 21 Before and after Correction Processing During Rotation Movement)

The evaluation unit 70 evaluates that "the sampling error is large even with the setting for the correction processing" when the evaluation unit 70 determines that a predefined condition (differences after the change of the setting pattern differences before the change) is satisfied during the rotation movement. The evaluation unit 70 reads cause data R9 (FIG. 29) associated with the evaluation (evaluation content RA) from the cause storage unit 90.

The user can check that the calibration is "not reasonable" and acquire information of the estimated cause RB (for example, the setting for the image correction processing is inappropriate) indicated by the cause data R9 and the countermeasure RC (the setting for the image correction processing is checked and adjusted) to address the cause by the cause data R9 being displayed.

In this case, the position associating screen in FIG. 24, for example, can also be displayed. The user can check the changes in the differences between the target positions 21 and the sampling positions 20 before and after the change of the setting pattern from the position associating screen in FIG. 24.

(H-10. Evaluation of Calibration Range from Differences from Target Positions 21 During Rotation Movement)

The evaluation unit 70 evaluates whether or not the sampling has been performed at the respective target positions 21 during the rotation movement on the basis of whether or not the sampling positions 20 have been stored in association with the respective target positions 21 in the position storage unit 80. When the evaluation unit 70 determines that the sampling positions 20 have not been stored, the evaluation unit 70 evaluates that "the calibration has been able to be performed only on a part of the image (the rotation center of the stage has not accurately been estimated)". The evaluation unit 70 reads cause data R10 (FIG. 30) associated with the evaluation (evaluation content RA) from the cause storage unit 90.

The user can check that the calibration is "not reasonable" and acquire information of the estimated cause RB (a driving condition of the moving mechanism and parameter setting for the image processing (for example, the setting value of the sampling angle range is inappropriate)) indicated by the cause data R10 and the countermeasure RC to address the cause (for example, whether or not the setting value of the angle range is reasonable (in particular, whether or not the angle range is too small) is checked, and the setting is adjusted) along with specific information RC1 of the countermeasure by the cause data R10 being displayed. In this case, the screen in FIG. 25 can be displayed as the position associating screen.

(H-11. Evaluation of Differences from Target Positions 21 During Rotation Movement with Angles)

The evaluation unit 70 detects the inclination of the feature image 22 associated with the sampling positions 20 during the rotation movement by matching the feature image 22 with the reference image that the reference data 35 has and evaluates that "the posture (angle) of the sampling result is not appropriate (the rotation center of the stage has inappropriately been estimated)" when the evaluation unit 70 determines that the detected inclination satisfies a predefined condition (the magnification of the inclination a specific threshold value of the reference data 35). The evaluation unit 70 reads cause data R11 (FIG. 30) associated with the evaluation (evaluation content RA) from the cause storage unit 90.

The user can check that the calibration is "not reasonable" and acquire information of the estimated cause RB (for example, the setting for detecting a rotating object is in appropriate) indicated by the cause data R11 and the countermeasure EC (for example, search setting related to detection of the rotating object is adjusted) along with the specific information RC1 of the countermeasure by the cause data R11 being displayed.

In a case in which the cause data R10 or R11 is output, the screen in FIG. 25 can be displayed as the position associating screen. The user can visually check the estimated rotation center of the stage and the error thereof form the position associating screen in FIG. 25.

(H-12. Evaluation of Sampling Intervals)

In the embodiment, it is estimated that the sampling is also performed at equal intervals in a case in which the target positions 21 are set at equal intervals.

In regard to this point, the evaluation unit 70 calculates intervals between the sampling positions 20 and variations in the intervals and evaluates that "the sampling intervals are not equal intervals (linearity)" when it is determined that a predefined condition (a magnitude of the variations ≥a specific threshold value of the reference data 35) is satisfied.

The evaluation unit 70 reads cause data R12 (FIG. 31) associated with the evaluation (evaluation content RA) from the cause storage unit 90.

The user can check that the calibration is "not reasonable" and acquire information of the estimated cause RB (for example, an imaging condition (for example, the camera is not installed perpendicularly to the calibration target)) indicated by the cause data R12 and the countermeasure RC (for example, the installation angle of the camera is checked and adjusted) along with the specific information RC1 of the countermeasure by the cause data R12 being displayed. The user can acquire support information for adjusting an attachment posture of the camera 104 from the cause data R12 displayed.

In a case in which the cause data R12 is output, the position associating screen in FIG. 21 can be displayed in a case of linear movement, and the position associating screen in FIG. 25 can be displayed in a case of rotation movement, as the position associating screen. The user can visually check the variations in the intervals between the sampling positions 20 from the position associating screen in FIG. 21 or 25.

(H-13. Evaluation of Sampling Positions from Differences from Target Positions 21)

The evaluation unit 70 calculates differences between the respective target positions 21 and the associated sampling positions 20 and evaluates that "the measurement has not been able to be performed at ideal sampling positions (linearity) when the evaluation unit 70 determines that the statistical values of the calculated differences satisfy a predefined condition (statistical values ≥a specific threshold value of the reference data 35). The evaluation unit 70 reads cause data R13 (FIG. 31) associated with the evaluation (evaluation content RA) from the cause storage unit 90.

The user can check that the calibration is "not reasonable" and acquire information of the estimated cause RB indicated by the cause data R13 and the countermeasure RC by the cause data R13 being displayed. The cause data R13 indicates estimation that the estimated cause RB is in the moving mechanism of the stage, for example, and indicates information that an inspection related to the precision of the stage, for example, is to be performed as the countermeasure RC.

In a case in which the cause data R13 is output, the position associating screen in FIG. 21 can be displayed in the case of linear movement, and the position associating screen in FIG. 25 can be displayed in the case of rotation movement, as the position associating screen. The user can visually check the differences of the respective sampling positions 20 from the target positions 21 from the position associating screen in FIG. 21 or 25.

<1. Illustration of User Interface (UI) Screen>

Figure 32:
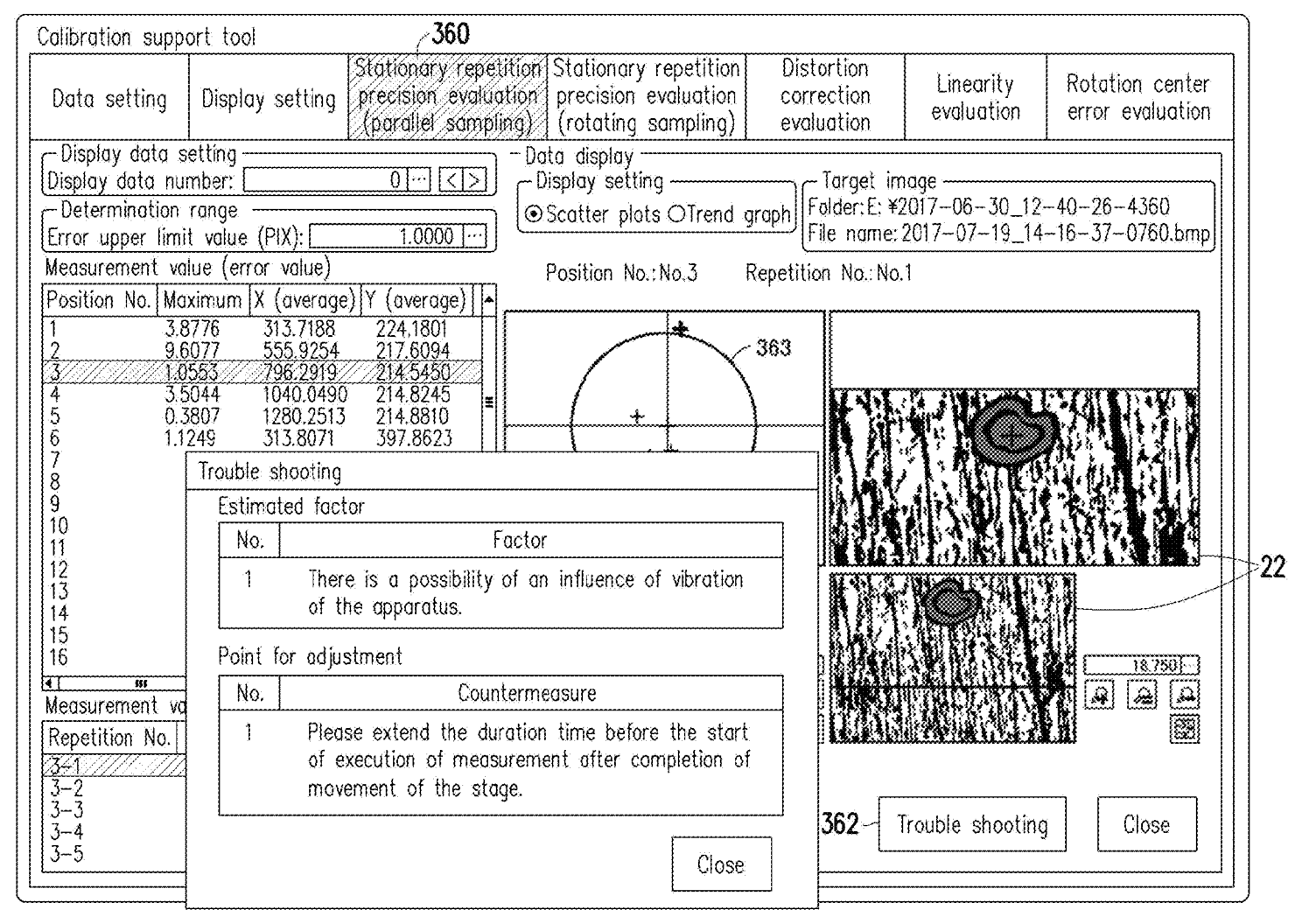
Figure 33:
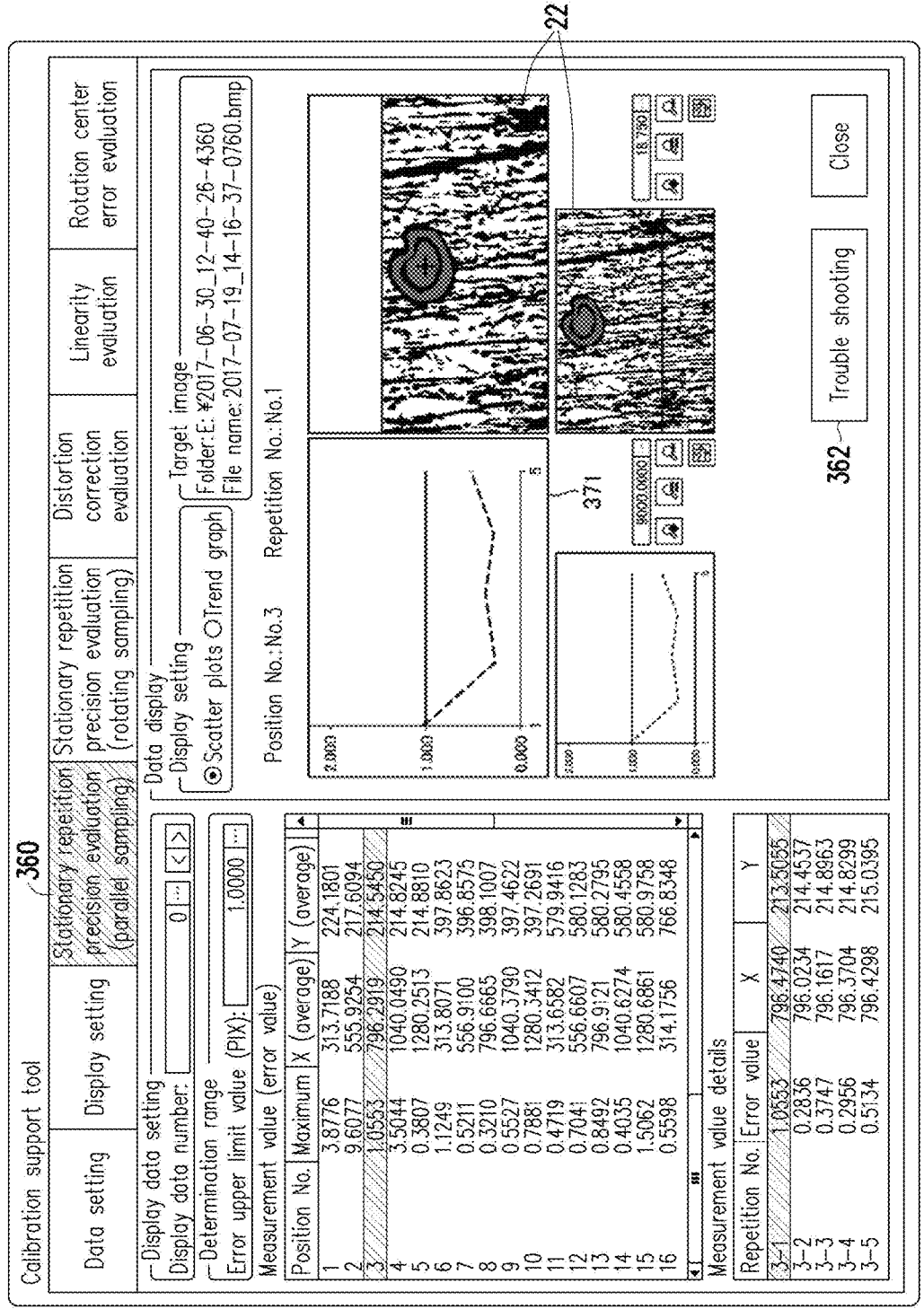
FIG. 33 is a diagram exemplifying the UI screen that is displayed during the calibration according to the embodiment of the present disclosure.

FIGS. 32 to 35 are diagrams of a user interface (UI) screen as illustration to be displayed during the calibration according to the embodiment. First, FIGS. 32 and 33 illustrate screens that represent results of sampling performed a plurality of times at the respective target positions 21, and the screens in FIGS. 32 and 33 are displayed by clicking a tab 360.

In FIG. 32, information of a target position 21 specified with the position No. 3, for example, is displayed. Specifically, values of a plurality of sampling positions 20 obtained by sampling performed a plurality of times at the target position 21 with the position No. "3" are represented by scatter plots 363, and an image of the feature image 22 associated with the target position 21 with the position No. "3" is presented. The user can determine degrees of differences between the target position 21 and the sampling positions 20 from the scatter plots 363. In addition, if the user operates a button 362, then a window 361 is displayed, and the cause data Ri based on the evaluation performed by the evaluation unit 70 is output. In the window 361, vibration of the apparatus is estimated as the estimated cause RB since the differences greatly vary in the scatter plots 363, for example, and information that a duration time before the start of the sampling is to be elongated after completion of the movement of the stage 2 is displayed as the countermeasure RC.

In FIG. 33, a chronological graph 371 is displayed instead of the scatter plots 363 in FIG. 32. The chronological graph 371 displays differences of the respective sampling positions 20 associated with the target position 21 from the target position 21 in a form of a chronological order that follows relative time elapse from the start of the detection of the plurality of sampling positions 20. According to the chronological graph 371, a change in values of the plurality of sampling positions 20 associated with the target position 21 designated by the position No. "3", for example, with elapse of time. The chronological graph 371 in FIG. 33 illustrates that the sampling positions 20 (broken line) at the target position 21 with the position No. "3" converges to a reasonable value at a relatively early timing from the start of the calibration (the start of the detection of the plurality of sampling positions 20) with reference to a specific threshold value (solid value) of the differences indicated by the reference data 35, for example. In this manner, the user can check that the vibrations of the apparatus do not affect the sampling.

Figure 34:
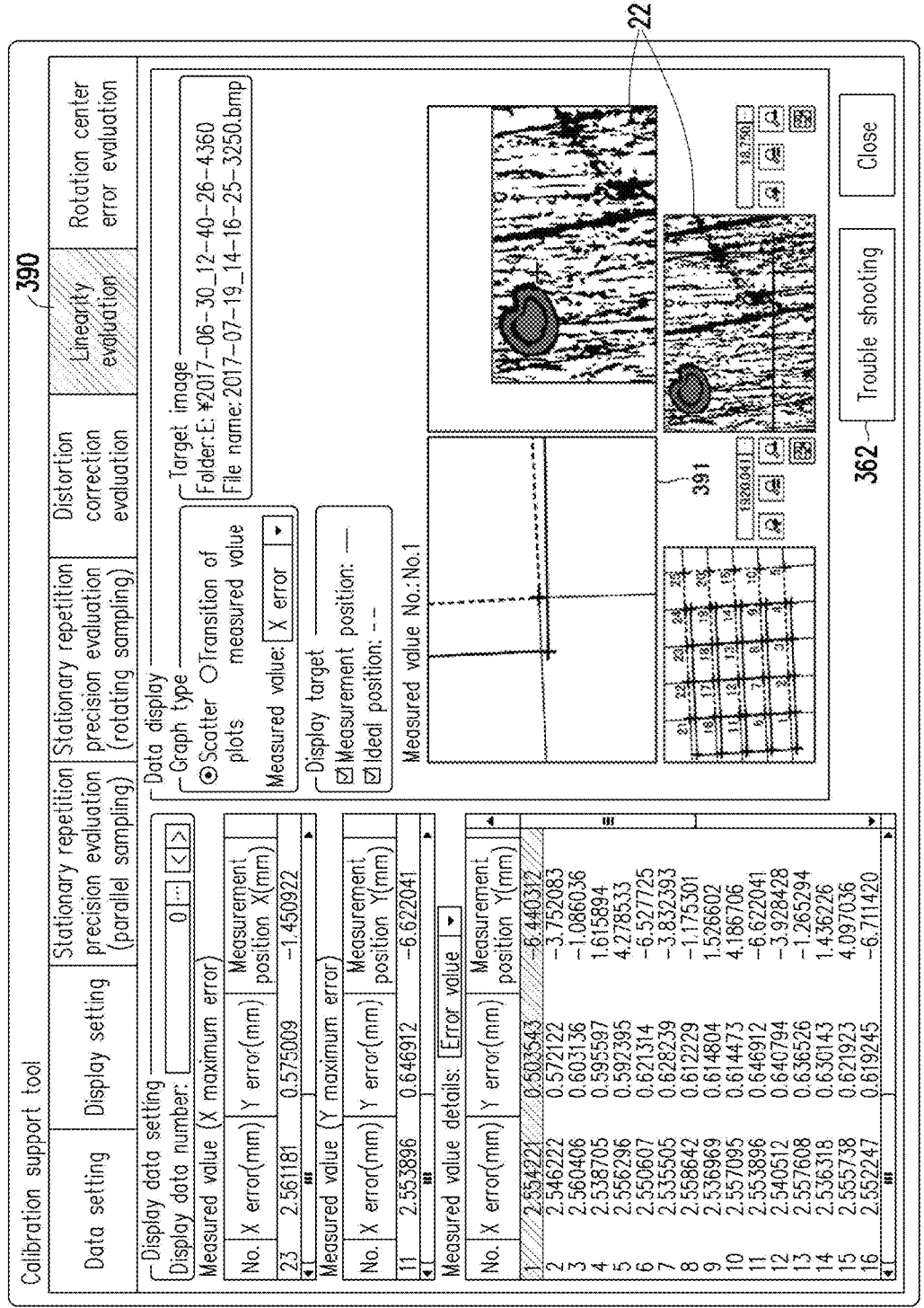
FIG. 34 is a diagram exemplifying the UI screen that is displayed during the calibration according to the embodiment of the present disclosure.
Figure 35:
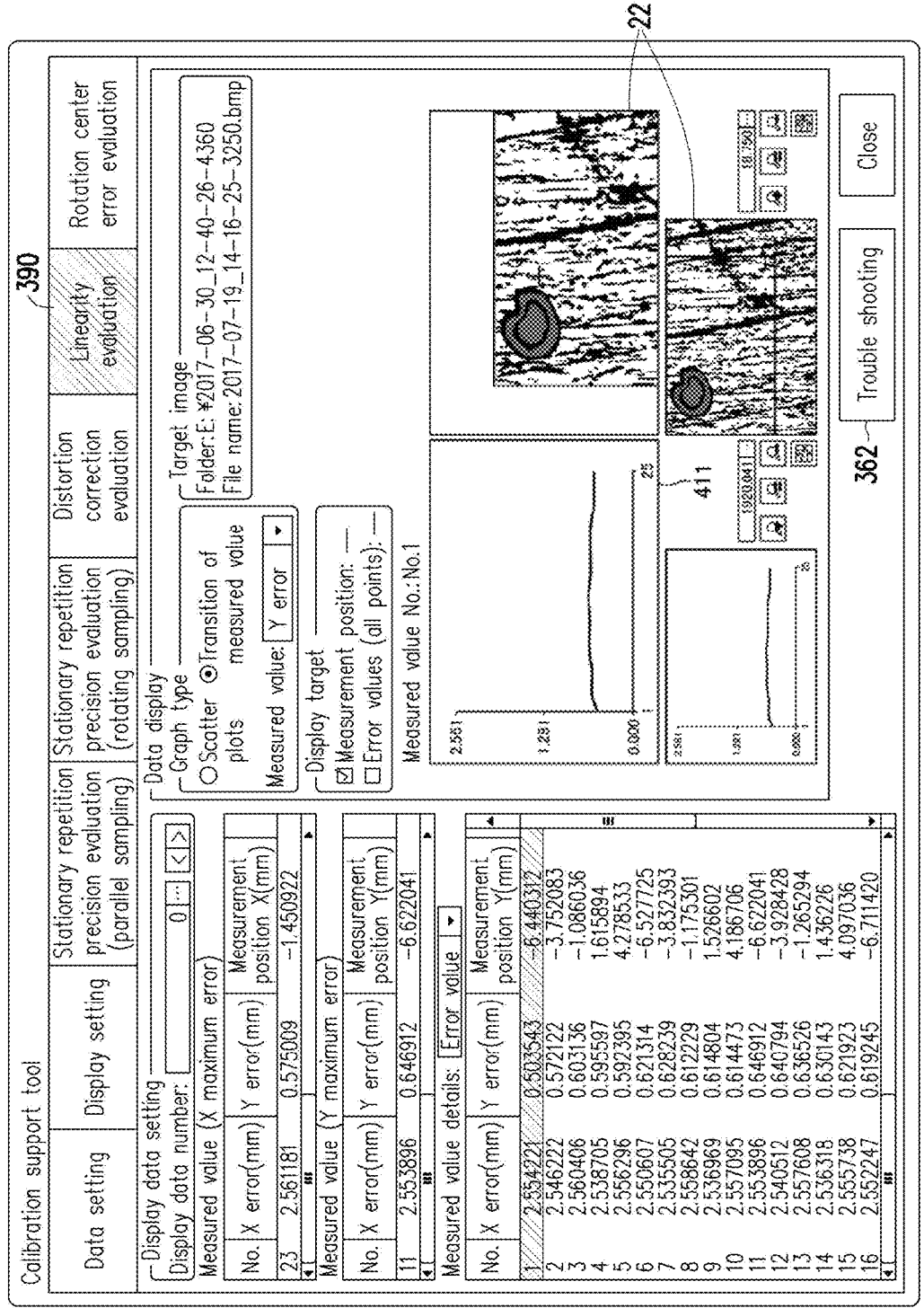
FIG. 35 is a diagram exemplifying the UI screen that is displayed during the calibration according to the embodiment of the present disclosure.

Next, FIGS. 34 and 35 illustrate UI screens for checking that the camera 104 has been installed under appropriate imaging conditions or that the driving conditions of the moving mechanism are appropriate.

Referring to FIG. 34, the variations in the sampling positions 20 associated with the target positions 21 are represented by the scatter plots 391 in association with the respective target positions 21. In addition, FIG. 35 illustrates a measurement value graph 411. The measurement value graph 411 represents changes of the differences between the respective target positions 21 and the associated sampling positions 20 due to relative time elapse from the start of the detection of the plurality of sampling positions 20. The user can check degrees of the differences between the target positions 21 and the sampling positions 20 at the respective target positions 21 or chronological changes in the difference from the scatter plots 391 or the measurement value graph 411. In this manner, it is possible to determine whether or not the imaging conditions or the motions of the moving mechanism are appropriate.

K. MODIFICATION EXAMPLE

The aforementioned embodiment can be modified as follows, for example. For example, it is possible to output, as files, data collected by the calibration (for example, the image data 10, the position data 30, various kinds of statistical information and display data obtained by the evaluation unit 70, and the like) to an external device in relation to a file output function.

In addition, it is possible to reproduce data display on an external controller by reading the aforementioned output files by the controller, in relation to a file reading function.

In addition, it is possible to activate a setting screen for a unit that has generated data from a data display screen (for example, a search unit that executes the sampling or image master calibration that has generated calibration data) and change the setting pattern from the activated screen. In addition, it is possible to perform the calibration in the changed setting pattern and to check new results. In addition, it is possible to update calibration parameters other than the aforementioned setting pattern from the activated screen. In a case in which the results of the calibration using the new setting pattern or calibration parameters do not show ideal data, it is also possible to return the data to previous data.

In addition, it is possible to perform calibration equivalent to that described above even in a case in which the image data 10 indicates three-dimensional image data in the embodiment. In addition, any of image data imaged by a single camera (a three-dimensional (3D) camera, for example) or synthesized image data from image data captured by a plurality of cameras can be applied as the three-dimensional image data.

In addition, the calibration results (for example, the position associating screen, results of the evaluation performed by the evaluation unit 70, or the like) may be collected and displayed on the display unit 132 while the position detecting apparatus 100 is caused to run, or alternatively, the calibration results may be displayed without causing the position detecting apparatus 100 to run, for the calibration performed by the position detecting apparatus 100. For example, the image data 10 imaged during movement to the respective target positions 21 may be accumulated in the image storage unit 60, and thereafter, image processing of detecting the sampling positions 20, evaluation processing, and an output using display data may be performed for the image data 10 associated with the respective target positions 21 in the image storage unit 60.

L. NOTES

The aforementioned embodiment includes the following technical ideas:
[Configuration 1]
A position detecting apparatus including: an image storage unit (60) that stores image data (10) obtained by imaging an object when a feature portion is positioned at a plurality of respective target positions (21) by a moving mechanism (300) configured to change the position of the object (4) in which the feature portion (14) for positioning is provided; an image processing unit (50) that detects positions of the feature portions included in the image data from the image data through image processing; a position storage unit (80) that stores the detected positions detected by the image processing portion in association with the target positions from the image data of the object positioned at the respective target positions; and a display data generation unit (85) that generates data for displaying information related to the detected positions on a display unit (132), in which the display data generation unit generates data for displaying the respective target positions and the respective detected positions, which are stored in association with the target positions, in a same coordinate space (FIGS. 15A-15D, 16, and 17).
[Configuration 2]
The position detecting apparatus according to Configuration 1, in which the object is moved to the respective target positions a plurality of times by the moving mechanism, and the detected positions stored in association with the respective target positions in the position storage unit include a plurality of detected positions detected from the image data imaged and acquired by being moved to the target positions a plurality of times.
[Configuration 3]
The position detecting apparatus according to Configuration 2, in which the coordinate space has multidimensional coordinate axes, and the display data generation unit generates data for displaying the target positions and the detected positions associated with the target positions on at least one coordinate axis from among the multidimensional coordinate axes.
[Configuration 4]
The position detecting apparatus according to Configuration 2 or 3, in which the data for displaying the respective detected positions includes data for displaying the plurality of associated detected positions in a form of scatter plots (183) in the coordinate space for each of the target positions.
[Configuration 5]
The position detecting apparatus according to Configuration 3 or 4, in which the data for displaying the respective detected positions includes data (191) for displaying the plurality of associated detected positions in a form of a chronological order that follows relative time elapse from a start of the detection of the plurality of detected positions for each of the target positions.
[Configuration 6]
The position detecting apparatus according to any one of Configurations 1 to 5, in which the data for displaying the respective detected positions includes data for displaying line segments (207; 208) that indicate relative positional relationships between the respective target positions and the detected positions associated with the target positions.
[Configuration 7]
The position detecting apparatus according to any one of claims 1 to 6, wherein the line segments that indicate the relative positional relationships include data for displaying a line segment (207) connecting the detected positions associated with the respective target positions in an order of the moving to the target positions by the moving mechanism or data for displaying a line segment (208) connecting the respective target positions in the order of the moving by the moving mechanism.
[Configuration 8]
The position detecting apparatus according to any one of Configurations 1 to 7, in which the moving includes rotational movement of rotating about a predefined target center position (cT) at a center, the target positions include the target center position, and the detected positions include an estimated center position (c) of the rotation, which is estimated from the respective detected positions associated with the respective target positions.
[Configuration 9]
The position detecting apparatus according to Configuration 8, in which the data for displaying the respective detected positions further includes data for displaying the respective target positions on a circumferential line (296) around the target center position at the center or data for displaying the detected positions associated with the respective target positions on a circumferential line (295) around the estimated center position at the center.
[Configuration 10]
The position detecting apparatus according to any one of Configurations 1 to 9, in which the data for displaying the respective detected positions includes data for displaying the detected positions with differences from the associated target positions exceeding a threshold value in a predefined
[Configuration 11]
The position detecting apparatus according to any one of Configurations 1 to 9, in which the image processing unit detects an inclination angle from a predefined posture of the feature portion from the image of the feature portion, and the data for displaying the respective detected positions includes data for displaying the detected positions associated with the target positions as a mark (255) that indicates the inclination angle.

[Configuration 12]

The position detecting apparatus according to any one of Configuration 1 to 11, in which the object is moved to the respective target positions a plurality of times by the moving mechanism, the detected positions stored in association with the respective target positions in the position storage unit include a plurality of detected positions detected from the image data imaged and acquired by being moved to the target positions a plurality of times, and the display data generation unit further generates data for displaying statistical values of the plurality of detected positions at the target positions in association with the respective target positions.

[Configuration 13]

The position detecting apparatus according to Configuration 12, in which the statistical values include at least one of a maximum value, a minimum value, and an average value of differences between the plurality of detected positions and the associated target positions.

[Configuration 14]

The position detecting apparatus according to Configuration 12 or 13, in which the display data generation unit further generates data (191) for displaying differences of the plurality of respective detected positions associated with the target positions from the target positions in a form of a chronological order that follows relative time elapse from a start of the detection of the plurality of detected position.

[Configuration 15]

The position detecting apparatus according to any one of Configurations 12 to 14, in which the display data generation unit associates differences of the plurality of detected positions associated with the target positions from the target positions with predefined threshold values of the differences and generates data (191) for displaying the respective detected positions in the form of the chronological order that follows the relative time elapse from the start of the detection of the plurality of detected positions.

[Configuration 16]

The position detecting apparatus according to any one of Configurations 1 to 15, in which the display data generation unit further includes a portion that generates data (192) for displaying the image data of the feature portion at which the detected positions are detected.

[Configuration 17]

The position detecting apparatus according to any one of Configurations 1 to 16, in which the display data generation unit further includes a portion (205) that displays the target positions and the detected positions associated with the target positions in an enlarged manner.

[Configuration 18]

The position detecting apparatus according to any one of Configurations 1 to 17, in which the image processing includes correction parameters for correcting the image data from an amount of movement of the moving mechanism in order to detect a position of the feature portion from the image data, and the detected positions associated with the target positions include respective detected positions obtained in image processing before and after application of the correction parameters.

[Configuration 19]

A position detecting apparatus including: an image storage portion (60) that stores image data (10) obtained by imaging an object when a feature portion (14) is positioned at a plurality of target positions by a moving mechanism (300) configured to change a position of the object (4) in which the feature portion for positioning are provided; an image processing portion (50) that detects positions of the feature portion that is included in the image data from the image data through image processing; a position storage portion (80) that stores the detected positions detected by the image processing portion in association with the target positions from the image data of the object positioned at the respective target positions; a cause storage portion (90) that stores a plurality of predefined cause data items (Ri) that have evaluation content (RA) that represents evaluation of positional differences from the target positions in a coordinate system and an estimated cause (RB) estimated for the positional differences in linkage with the evaluation content; an evaluation portion (70) that evaluates detection differences that are differences between the target positions and the associated detected positions in the coordinate system in the position storage portion on a basis of a predefined reference (35); and a display data generation portion (85) that generates data for displaying information related to the evaluation on a display unit, in which the display data generation portion generates data for displaying the estimated cause in the cause storage portion, which correspond to the evaluation content that represents evaluation by the evaluation portion.

[Configuration 20]

The position detecting apparatus according to Configuration 19, in which the cause storage portion stores a countermeasure (RC) for addressing the estimated cause in linkage with the estimated cause, and the display data generation portion further generates data for displaying the countermeasure that corresponds to the estimated cause.

[Configuration 21]

The position detecting apparatus according to Configuration 19, in which the object is moved to the respective target positions a plurality of times by the moving mechanism, and the detected positions stored in association with the respective target positions in the position storage portion include a plurality of detected positions detected from the image data imaged and acquired by being moved to the target positions a plurality of times.

[Configuration 22]

The position detecting apparatus according to Configuration 21, in which the detection differences include statistical values of the differences between the target positions and the plurality of associated detected positions in the position storage portion.

[Configuration 23]

The position detecting apparatus according to Configuration 22, in which the statistical values include at least one of values that indicate an average value, a maximum value, a minimum value, and a variation in the differences from the plurality of detected positions.

[Configuration 24]

The position detecting apparatus according to any one of Configurations 19 to 23, in which the estimated cause includes at least one of a condition for driving the moving mechanism, a parameter for the image processing, and a condition for imaging.

[Configuration 25]

The position detecting apparatus according to any one of Configurations 19 to 24, wherein the display data generation portion generates data for displaying the respective target positions and the respective detected positions stored in association with the target positions in the same coordinate space (FIGS. 15A-15D, 16, and 17).

[Configuration 26]

A program for causing a computer (110) to execute a position detecting method, the position detecting method including the steps of: detecting (S3) a position of a feature portion that is included in image data from image data (10) acquired by imaging an object through image processing when the feature portion is positioned at a plurality of respective target positions (21) by a moving mechanism (300) configured to change a position of the object (4) in which the feature portion (14) for positioning is provided; associating and storing the detected positions (20) detected through the image processing with the target positions from the image data of the object positioned at the respective target positions; and generating (S15) data for displaying information related to the detected positions on a display unit (132), in which in the generating of the data for displaying the information, data (FIGS. 15A-15D, 16, and 17) for displaying the respective target positions and the respective detected positioned stored in association with the target positions in a same coordinate space is generated.

[Configuration 27]

A program for causing a computer (110) to execute a position detecting method, the computer including a cause storage unit (90) that stores a plurality of predefined cause data items (Ri) that have evaluation content (RA) that represents evaluation of positional differences from the target positions in a coordinate system and an estimated cause (RB) estimated for the positional differences in linkage with the evaluation content, the position detecting method including the steps of: detecting (S3) a position of a feature portion that is included in image data from image data (10) acquired by imaging an object through image processing when the feature portion is positioned at a plurality of respective target positions by a moving mechanism (300) configured to change a position of the object in which the feature portion for positioning is provided; associating and storing the detected positions (20) detected through the image processing with the target positions from the image data of the object positioned at the respective target positions; evaluating (S9) detection differences that are differences in the coordinate system between the stored target positions and the associated detected positions on a basis of predefined reference; and generating (S15) data for displaying information related to the evaluation on a display unit (132), in which in the generating of the data to be displayed, data for displaying the estimated cause, which corresponds to the evaluation content that represents the evaluation in the evaluating, in the cause storage unit, in the cause storage unit is generated.

In the related art, knowhow of a person skilled in positioning is needed, and it takes a time for the user to seek out a cause when the precision required for positioning is not satisfied during running or activation of a positioning device.

Meanwhile, since the sampling position 20 detected from the image data 10 obtained by imaging the workpiece 4 or the like that has moved to each target position 21 is stored in association with the target position 21, and the data for displaying each stored sampling position 20 and the target position 21 associated with the sampling position 20 in the same coordinate space is generated in the calibration, such display information can be support information for specifying the aforementioned cause in the embodiment. In this manner, the time taken to seek out the aforementioned cause can be shortened.

In addition, the evaluation unit 70 evaluates a difference between the sampling position 20 and the target position 21 stored in association in the position storage unit 80 in association with the predefined reference data 35, a cause that may cause the difference is estimated by the evaluation, and the display data for the estimated cause is generated. In this manner, it is possible to present the estimated cause as support information when the aforementioned cause is sought out and to easily specify a final cause.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents. ting apparatus

What is claimed is:

1. A position detecting apparatus comprising:
    an image storage portion that stores image data obtained by imaging an object when a feature portion is positioned at a plurality of respective target positions by a moving mechanism configured to change the position of the object in which the feature portion for positioning is provided;
    an image processing portion that detects positions of the feature portions included in the image data from the image data through image processing;
    a position storage portion that stores the detected positions detected by the image processing portion in association with the target positions from the image data of the object positioned at the respective target positions; and
    a display data generation portion that generates data for displaying information related to the detected positions on a display unit,
    wherein the display data generation portion generates data for displaying the respective target positions and the respective detected positions, which are stored in association with the target positions, in the same coordinate space.

2. The position detecting apparatus according to claim 1, wherein the object is moved to the respective target positions a plurality of times by the moving mechanism, and
    the detected positions stored in association with the respective target positions in the position storage portion include a plurality of detected positions detected from the image data imaged and acquired by being moved to the target positions a plurality of times.

3. The position detecting apparatus according to claim 2, wherein the coordinate space has multidimensional coordinate axes, and
    the display data generation portion generates data for displaying the target positions and the detected positions associated with the target positions on at least one coordinate axis from among the multidimensional coordinate axes.

4. The position detecting apparatus according to claim 2, wherein the data for displaying the respective detected positions includes data for displaying the plurality of associated detected positions in a form of scatter plots in the coordinate space for each of the target positions.

5. The position detecting apparatus according to claim 3, wherein the data for displaying the respective detected positions includes data for displaying the plurality of associated detected positions in a foini of a chronological order that follows relative time elapse from a start of the detection of the plurality of detected positions for each of the target positions.

6. The position detecting apparatus according to claim 1, wherein the data for displaying the respective detected positions includes data for displaying line segments that indicate relative positional relationships between the respective target positions and the detected positions associated with the target positions.

7. The position detecting apparatus according to claim 1, wherein the line segments that indicate the relative positional relationships include data for displaying a line segment connecting the detected positions associated with the respective target positions in an order of the moving to the target positions by the moving mechanism or data for displaying a line segment connecting the respective target positions in the order of the moving by the moving mechanism.

8. The position detecting apparatus according to claim 1, wherein the moving includes rotational movement of rotating about a predefined target center position at a center, the target positions include the target center position, and the detected positions include an estimated center position of the rotation, which is estimated from the respective detected positions associated with the respective target positions.

9. The position detecting apparatus according to claim 8, wherein the data for displaying the respective detected positions further includes data for displaying the respective target positions on a circumferential line around the target center position at the center or data for displaying the detected positions associated with the respective target positions on a circumferential line around the estimated center position at the center.

10. The position detecting apparatus according to claim 1, wherein the data for displaying the respective detected positions includes data for displaying the detected positions with differences from the associated target positions exceeding a threshold value in a predefined form.

11. The position detecting apparatus according to claim 1, wherein the image processing portion detects an inclination angle from a predefined posture of the feature portion from the image of the feature portion, and the data for displaying the respective detected positions includes data for displaying the detected positions associated with the target positions as a mark that indicates the inclination angle.

12. The position detecting apparatus according to claim 1, wherein the object is moved to the respective target positions a plurality of times by the moving mechanism, the detected positions stored in association with the respective target positions in the position storage portion include a plurality of detected positions detected from the image data imaged and acquired by being moved to the target positions a plurality of times, and the display data generation portion further generates data for displaying statistical values of the plurality of detected positions at the target positions in association with the respective target positions.

13. The position detecting apparatus according to claim 12, wherein the statistical values include at least one of a maximum value, a minimum value, and an average value of differences between the plurality of detected positions and the associated target positions.

14. The position detecting apparatus according to claim 12, wherein the display data generation portion further generates data for displaying differences of the plurality of detected positions associated with the target positions from the target positions in a form of a chronological order that follows relative time elapse from a start of the detection of the plurality of detected position.

15. The position detecting apparatus according to claim 12, wherein the display data generation portion associates differences of the plurality of detected positions associated with the target positions from the target positions with predefined threshold values of the differences and generates data for displaying the respective detected positions in the form of the chronological order that follows the relative time elapse from the start of the detection of the plurality of detected positions.

16. The position detecting apparatus according to claim 1, wherein the display data generation portion further includes a portion that generates data for displaying the image data of the feature portion at which the detected positions are detected.

17. The position detecting apparatus according to claim 1, wherein the display data generation portion further includes a portion that displays the target positions and the detected positions associated with the target positions in an enlarged manner.

18. The position detecting apparatus according to claim 1, wherein the image processing includes correction parameters for correcting the image data from an amount of movement of the moving mechanism in order to detect a position of the feature portion from the image data, and the detected positions associated with the target positions include respective detected positions obtained in image processing before and after application of the correction parameters.

19. A non-transitory computer-readable recording medium comprising a program for causing a computer to execute a position detecting method, the position detecting method comprising the steps of:

detecting a position of a feature portion that is included in image data from the image data acquired by imaging an object through image processing when the feature portion is positioned at a plurality of respective target positions by a moving mechanism configured to change a position of the object in which the feature portion for positioning is provided;

storing the detected positions detected through the image processing in association with the target positions from the image data of the object positioned at the respective target positions; and generating data for displaying information related to the detected positions on a display unit, wherein the generating of the data for displaying the information includes generating data for displaying the respective target positions and the respective detected positions stored in association with the target positions in the same coordinate space.

* * * * *